(12) United States Patent
Conlon

(10) Patent No.: US 7,699,735 B2
(45) Date of Patent: Apr. 20, 2010

(54) ELECTRICALLY-VARIABLE TRANSMISSION HAVING TWO FORWARD LOW RANGE ELECTRICALLY-VARIABLE MODES AND A REVERSE ELECTRICALLY-VARIABLE MODE

(75) Inventor: Brendan M. Conlon, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 514 days.

(21) Appl. No.: 11/679,000

(22) Filed: Feb. 26, 2007

(65) Prior Publication Data

US 2008/0207373 A1 Aug. 28, 2008

(51) Int. Cl.
*F16H 3/72* (2006.01)

(52) U.S. Cl. ................ 475/5; 180/65.225; 180/65.7

(58) Field of Classification Search ............ 475/5, 475/275, 276, 278, 280; 180/65.21, 65.225, 180/65.6, 65.7
See application file for complete search history.

(56) References Cited

U.S. PATENT DOCUMENTS

| 6,527,658 | B2 | 3/2003 | Holmes et al. | |
|---|---|---|---|---|
| 6,953,409 | B2 | 10/2005 | Schmidt et al. | |
| 7,261,657 | B2 * | 8/2007 | Bucknor et al. | 475/5 |
| 7,282,004 | B2 * | 10/2007 | Raghavan et al. | 475/5 |
| 7,338,401 | B2 * | 3/2008 | Klemen et al. | 475/5 |
| 7,500,930 | B2 * | 3/2009 | Raghavan et al. | 475/5 |

* cited by examiner

*Primary Examiner*—David D Le
(74) *Attorney, Agent, or Firm*—Quinn Law Group, PLLC

(57) ABSTRACT

An electrically-variable transmission is provided with input member and output member, first and second motor/generators, a first planetary gear set and multiple additional planetary gear sets as well as at least four torque-transmitting mechanisms that are selectively engagable alone or in different combinations to establish a reverse electrically-variable operating mode, at least three forward electrically-variable operating modes, including two low range forward electrically-variable modes and a high range forward electrically-variable mode.

22 Claims, 6 Drawing Sheets

ELECTRICALLY-VARIABLE TRANSMISSION HAVING TWO FORWARD LOW RANGE ELECTRICALLY-VARIABLE MODES AND A REVERSE ELECTRICALLY-VARIABLE MODE

TECHNICAL FIELD

The invention relates to an electrically-variable transmission having two electrically-variable low range modes, an electrically-variable reverse mode and at least one electrically-variable high range mode.

BACKGROUND OF THE INVENTION

Electrically-variable transmissions typically have an input member connected to an engine and one or two motor/generators connected to different members of planetary gear sets to allow one or more electrically-variable modes of operation, fixed speed ratio modes, and an electric-only (battery powered) mode. An "electrically-variable mode" is an operating mode in which the speed ratio between the transmission input member and the transmission output member is determined by the speed of one of the motor/generators. Electrically-variable transmissions may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods to keep the engine off longer, supplement engine torque or power and/or operate at a lower engine speed, or supplement accessory power supplies. Transient demand for engine torque or power is supplemented by the motor/generators during operation in engine-on, electrically-variable modes, allowing for downsizing the engine without reducing apparent vehicle performance. Additionally, the motor/generators are very efficient in accessory power generation and electric power from the battery serves as an available torque reserve allowing operation at a relatively low transmission numerical speed ratio.

Electrically variable transmission modes may be classified as input-split, output-split, or compound-split modes. Input-split modes have one of the motor/generators geared such that its speed varies in direct proportion to the transmission output, and the other motor/generator geared such that its speed is a linear combination of the input member and the output member speeds. Output-split modes have one of the motor/generators geared such that its speed varies in direct proportion to the transmission input member, and the other motor/generator geared such that its speed is a linear combination of the input member and the output member speeds. A compound-split mode has both motor/generators geared such that their speeds are linear combinations of the input member and the output member speeds but neither is in direct proportion to either the speed of the input member or the speed of the output member.

SUMMARY OF THE INVENTION

An electrically-variable transmission is provided with two different forward low range electrically-variable operating modes, at least one forward high range electrically-variable operating mode and a reverse electrically-variable operating mode. By providing two different forward low range electrically-variable operating modes, the overall transmission ratio spread is improved. One of the forward low range electrically-variable operating modes may be optimized for a speed ratio range which will allow reduced motor power requirements. Additionally, shifting between electrically-variable modes may be accomplished with clutch-clutch shifts, potentially decreasing shift times versus synchronous shifts that are executed purely by changing motor speeds while operating in an EVT mode.

Specifically, an electrically-variable transmission includes an input member, an output member, and first and second motor/generators. The transmission includes a first planetary gear set representable by a first three-node lever having a first, a second and a third node. Multiple additional planetary gear sets are representable by at least one additional lever having at least five additional nodes. The first motor/generator is connected with the first node, the input member is connected with the second node, and the second motor/generator is connected with the third node. The first node is continuously connected for common rotation with one of the five additional nodes of the additional planetary gear set. The transmission includes at least four torque-transmitting mechanisms that are selectively engageable alone or in different combinations to connect different ones of the nodes to one another or to a stationary member, thereby establishing a reverse electrically-variable operating mode, and at least three forward electrically-variable operating modes that include a first forward electrically-variable mode, a second forward electrically-variable mode, and a third forward electrically-variable mode. The third forward electrically-variable mode is achieved subsequent to the selected one of the first or second forward electrically-variable modes as speed of the output member increases. Accordingly, the first and second forward electrically-variable modes are characterized as low range modes and the third forward electrically-variable mode is characterized as a high range mode. Preferably, the first and second forward electrically-variable modes are input-split modes and the third forward electrically-variable mode is a compound-split mode.

In one embodiment, the multiple additional planetary gear sets are at least two additional planetary gear sets representable by at least one additional lever having additional nodes including a fourth, a fifth, a sixth, a seventh and an eighth node. The first motor/generator is connected with the first node and the input member is connected with the second node. The second motor/generator is connected with a third node. The first node is continuously connected for common rotation with the fourth node. A first torque-transmitting mechanism is selectively engageable to connect the second node for common rotation with the fifth node. A second torque-transmitting mechanism is selectively engageable to ground the fifth node to a stationary member. The output member is connected to the sixth node. A third torque-transmitting mechanism is selectively engageable to engage the seventh node with the stationary member. A fourth torque-transmitting mechanism is selectively engageable to ground the eighth node to the stationary member. Engagement of selected ones of the torque-transmitting mechanisms in different combinations at least partially establishes multiple forward electrically-variable modes and a reverse electrically-variable mode.

In one embodiment, alternate engagement of the third torque-transmitting mechanism and the fourth torque-transmitting mechanism establishes a first forward electrically-variable mode and a second forward electrically-variable mode, respectively. Engagement of the first torque-transmitting mechanism establishes a third forward electrically-variable mode subsequent to the selected one of the alternate first and second forward electrically-variable modes as speed of the output member increases.

In one embodiment, the multiple additional planetary gear sets are representable by a single five-node lever, including a fourth, a fifth, a sixth, a seventh and an eight node. The four torque-transmitting mechanisms include a first torque-transmitting mechanism selectively engageable to connect the second node for common rotation with the fifth node, a second torque-transmitting mechanism selectively engageable to ground the fifth node to a stationary member, with the output member connected to the sixth node. A third torque-transmitting mechanism is selectively engagable to ground the seventh node to the stationary member, and a fourth torque-transmitting mechanism is selectively engageable to ground the eighth node to the stationary member. Engagement of the third torque-transmitting mechanism, the fourth torque-transmitting mechanism, and the first torque-transmitting mechanism provides, sequentially, the first forward electrically-variable mode, the second forward electrically-variable mode and the third forward electrically-variable mode. Engagement of the second torque-transmitting mechanism establishes the reverse electrically-variable mode. Preferably, a fifth torque-transmitting mechanism is also provided that is selectively engageable to connect the first node to the third node during the reverse electrically-variable mode to establish a reverse fixed ratio mode. Sixth and/or seventh torque-transmitting mechanisms may also be provided to establish additional forward fixed ratio modes. The sixth torque-transmitting mechanism is selectively engagable to ground the fourth node to the stationary member and the seventh torque-transmitting mechanism is selectively engageable to ground the third node to the stationary member.

Preferably, engagement of the second torque-transmitting mechanism during the third forward electrically-variable mode establishes an electric-only mode in which the input member does not rotate and the first and second motor/generators act as motors, each providing torque that is combined to drive the output member. As used herein, an "electric-only" mode is an operating mode in which the transmission is being powered only by one or both motor/generators. Preferably, regenerative braking may occur during this mode.

The electrically-variable transmission may include a battery that is operatively connected to the motor/generators for providing power to and receiving power from the motor/generators. The battery may be configured to be operatively connected with an offboard power supply that recharges the battery. The recharged battery may then be used to power the motor/generators during the electric-only mode. (As used herein, an "offboard power supply" is a power supply not located on a vehicle on which the electrically-variable transmission is installed.) Various offboard power supply systems may be used, including those that use an offboard conductive charger, an offboard inductive charger, or an onboard charger.

In one embodiment the multiple additional planetary gear sets are a second planetary gear set respresentable by a second three node lever and a third planetary gear set representable by a third three node lever. The second and third three node levers together include a fourth, a fifth, a sixth, a seven, an eighth and a ninth node. The torque-transmitting mechanisms include a first torque-transmitting mechanism selectively engageable to connect the second node for common rotation with the fifth node, a second torque-transmitting mechanism selectively engageable to ground the ninth node to the stationary member, a third torque-transmitting mechanism selectively engageable to connect the seventh node with one of the eighth node or the stationary member, a fourth torque-transmitting mechanism selectively engageable to ground the eighth node to the stationary member, and a fifth torque-transmitting mechanism selectively engageable to connect the seventh node to the sixth node. The output member is connected with the sixth node. In this embodiment, the third and fourth torque-transmitting mechanisms are engaged to establish the first forward electrically-variable mode, the fourth and fifth torque-transmitting mechanisms are engaged to establish the second forward electrically-variable mode, the first and fifth torque-transmitting mechanisms are engaged to establish the third forward electrically-variable mode. The second torque-transmitting mechanism is engaged along with one of the other torque-transmitting mechanisms (either the third or the fifth torque-transmitting mechanism) to establish a reverse electrically-variable mode. The third and fifth torque-transmitting mechanisms may be engaged to establish a fourth forward electrically-variable mode subsequent to the third forward electrically-variable mode as the speed of the output member increases. In this embodiment, the third torque-transmitting mechanism may be a rotating-type clutch selectively engagable to connect the seventh node with the eighth node. Alternatively, the third torque-transmitting mechanism may be a brake-type clutch selectively engagable to connect the seventh node with the stationary member. If the third torque-transmitting mechanism is a rotating-type clutch, a direct drive, fixed ratio may be achieved by engagement of the first torque-transmitting mechanism, the third torque-transmitting mechanism, and the fifth torque-transmitting mechanism.

A key advantage of this design over other electrically-variable transmission designs for reverse is that the electrical power flow is forward (non-circulating) in both forward and reverse modes. Electrical circulating power in an electrically-variable transmission refers to a condition where the mechanical path carries more than 100% of the output power. Under normal forward electrical power flow conditions, the engine power is split with some portion transmitted electrically and the remainder transmitted mechanically. When a typical electrically-variable transmission operates in reverse, the direction of the electrical power flow is reversed, so the mechanical path must carry the full output power plus the electrical power. Under this condition, the electrical power is said to be circulating in the system. Therefore, the electrical path torque and power must be sized for greater than 100% of the output torque and power in order to accommodate the circulating power. Maximum output torque of a typical electrically-variable transmission is obtained with the engine not producing torque, using battery power. Maximum output torque of the electrically variable transmission of the present invention is obtained with the engine on, yielding more robust performance. Due to the improved reverse performance, the typical requisite increase in motor size and/or higher transmission or planetary ratios is not required in order to achieve sufficient reverse grade performance.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
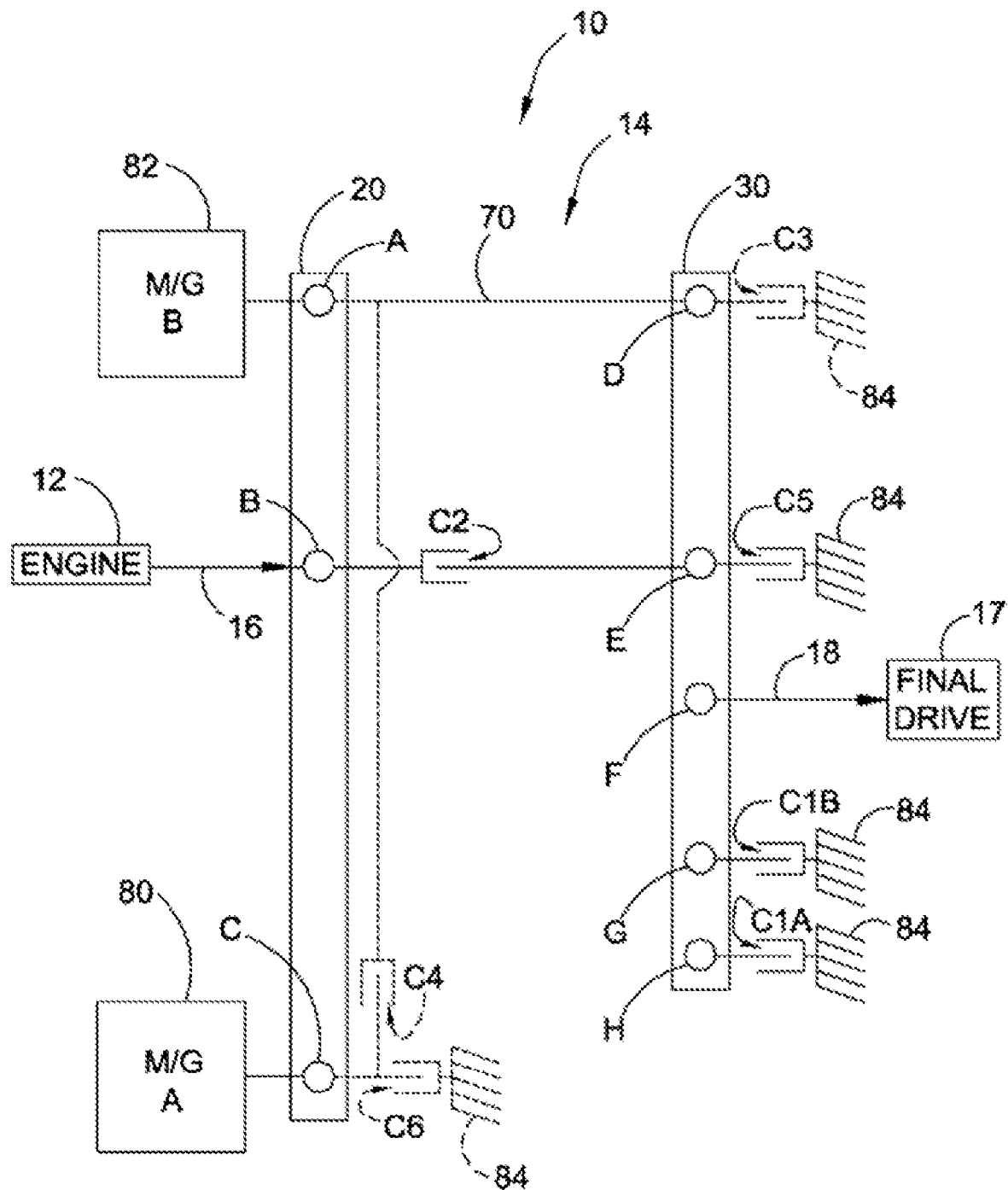
FIG. 1 is a schematic illustration of a transmission in lever diagram form having a three-node lever and a five-node lever in collapsed form.

Referring to the drawings, wherein like reference numbers refer to like components, FIG. 1 illustrates a powertrain 10 including an engine 12 connected to an electrically-variable transmission 14. The transmission 14 is designed to receive at least a portion of its driving power from the engine 12 in some of its operating modes, as discussed below. The engine has an output shaft that serves as an input member 16 of the transmission 14. A final drive unit 17 is operatively connected to an output member 18 of the transmission 14.

The transmission 14 includes a three-node lever 20 representing a first planetary gear set having a first, a second and a third member, represented by nodes A, B and C, respectively. The members may be a ring gear member, a sun gear member and a carrier member, although not necessarily in that order. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members, such as the input member or the output member.

The transmission 14 further includes a five-node lever 30 representing two or more compounded planetary gear sets having members interconnected to establish five nodes D, E, F, G and H. The nodes D, E, F, G and H may each represent a ring gear member, a sun gear member, a carrier member, or compounded (i.e., continuously connected for common rotation) combinations of one or more of such members from different planetary gear sets. As illustrated and described below with respect to FIGS. 2, and 3, the five-node lever 30 may be represented by three (as in FIGS. 2 and 3) separate levers compounded together with various nodes connected for common rotation. Those skilled in the art will readily recognize that such levers having no selective connections therebetween may be represented schematically as a collapsed, single five-node lever as well, because, in such embodiments, nodes connected for common rotation function equivalently as and may alternatively be represented by a single node.

The transmission 14 has several fixed interconnections. A first interconnecting member 70, such as a shaft or hub, continuously interconnects node A for common rotation with node D. A motor/generator 82 (also referred to as M/G B) is continuously connected with node A. The input member 16 is connected for common rotation with node B. Another motor/generator 80 (also referred to as M/G A) is connected or common rotation with node C. Node F is connected for common rotation with the output member 18.

The transmission 10 also has several selectively engagable torque-transmitting mechanisms that provide various operating modes, as described below. Torque-transmitting mechanism C2, a rotating clutch, also referred to herein as a high range clutch, is selectively engagable to connect node B for common rotation with node E. Torque-transmitting mechanism C5, a stationary clutch, also referred to herein as a reverse brake, is selectively engagable to ground node E to a stationary member 84, such as a casing or housing for the transmission 14. Another torque-transmitting mechanism C1B, a stationary clutch, also referred to as a low range brake, is selectively engagable to ground node G to the stationary member 84. Finally, torque-transmitting mechanism C1A, a stationary clutch also referred to as a low range brake, is selectively engagable to ground node H to the stationary member 84.

Additional, optional torque-transmitting mechanisms (shown in phantom in FIG. 1 to denote that they are optional) may be included to provide additional operating modes, as described below. Optional torque-transmitting mechanism C3, a stationary clutch, is selectively engagable to ground node D (and therefore node A and motor/generator 82) to the stationary member 84. Optional torque-transmitting mechanism C4, a rotating clutch, is selectively engagable to connect node A for common rotation with node C. By connecting the two members of the planetary gear set represented by the nodes A and C of lever 20, engagement of torque-transmitting mechanism C4 causes all members of the planetary gear set represented by lever 20 to rotate at the same speed, thus functioning as a lock-up clutch. Optional torque-transmitting mechanism C6, a stationary clutch, is selectively engagable to ground node C to the stationary member 84. As will be understood by those skilled in the art, the motor/generators 80, 82 each have a rotor that is rotatable and a stator that is continuously grounded to the stationary member 84.

Each embodiment of a powertrain and transmission discussed herein has an onboard energy storage device that is operatively connected to the motor/generators such that the motor/generators may transfer power to or receive power from the energy storage device. A controller or ECU is operatively connected to the energy storage device to control the distribution of power from or to the energy storage device. As used herein, an "onboard" energy storage device is an energy storage device that is mounted on the vehicle to which the powertrain with the motor/generators is also mounted. An onboard energy storage device may be one or more batteries. Other onboard energy storage devices, such as fuel cells or capacitors, have the ability to provide, or store and dispense, electric power and may be used in combination with or in place of batteries. An onboard energy storage device (in the form of battery 86) and a controller 88 are shown and described with respect to the embodiments of FIGS. 4, 5, 8 and 9, which are shown in stick-diagram form. The embodiments of FIGS. 1, 2, 3, 6 and 7, which are shown in lever diagram form, also incorporate an onboard energy storage device and controller, although not shown, which are operatively connected to the motor/generators in like manner as shown in FIGS. 4, 5, 8 and 9. Operating data gathered by sensors, such as the speed of the input member 16 and of the output member 18, may be provided to the controller as well, for various uses, such as when operating in a regenerative braking mode.

The onboard energy storage device or battery 86 may be configured to be rechargeable by an offboard power supply. As used herein, an "offboard" power supply is a power supply that is not mounted on the vehicle with the powertrain, is not integral with the transmission, and is operatively connected to the onboard energy storage device only during recharging thereof. Different offboard power supply systems that establish connectivity between the onboard battery 86 and an offboard power supply for recharging of the battery 86 are shown and described with respect to FIGS. 10A-10C.

Operational Description

Except where otherwise indicated, the following operational modes are achieved by each of the embodiments of FIGS. 1-5. The modes are described in detail with respect to the embodiment of FIG. 1; the embodiments of FIGS. 2-5 operate in like manner, unless otherwise noted.

Two Forward Electrically-Variable Low Range Operating Modes

The powertrain 10 is capable of launching a vehicle (not shown) either with engine 12 off or with engine 12 running. The powertrain 10 may launch in either of two forward electrically-variable low range operating modes by closing either torque-transmitting mechanism C1A or C1B. If the engine 12 is off, torque-transmitting mechanism C1A or C1B is engaged and motor/generator 82 (M/G B) is used to launch the vehicle through a reduction gear ratio provided by lever 30. The engine 12 remains at zero speed and motor/generator 80 (M/G A) spins in the reverse direction. To start the engine 12, motor/generator (M/G A) decelerates to zero speed while motor/generator 82 (M/G B) provides reaction torque as well as torque to drive the vehicle. This accelerates the engine 12 to a speed where it may be fueled. Once the engine 12 is running, engine power is split through lever 20 and motor/generator 80 (M/G A), which generates power while motor/generator 82 (M/G B) motors, to establish an input-split, forward electrically-variable low range operating mode. Power is transmitted to the output member 18 through both a mechanical and an electrical path. The mechanical power path is from the engine 12 to lever 20, then to lever 30 through interconnecting member 70, from lever 30 to output member 18. The gear tooth counts of the gear members of the planetary gear sets represented by nodes B, A, D, E and F of the interconnected levers 20 and 30 provide a reduction ratio, so that the output member 18 rotates at a slower speed than the input member 16, and the motor/generators 80 and 82 vary the speed of rotation of nodes C and A, respectively, to provide a range of speed ratios during the forward electrically-variable mode established by engagement of C1A (or the alternative forward electrically-variable mode established by engagement of C1B) so that the mode is characterized as an electrically-variable low range mode. The electrical power path is from the motor/generator 82 (M/G B) through node A of lever 20 to node D of lever 30, and then through the lever 30 to the output member 18. Power flow is in the forward direction (non-circulating) as long as motor/generator 80 (M/G A) has positive speed. When the speed of motor/generator 80 (M/G A) is negative, motor/generator 82 (M/G B) acts as a generator to supply power to motor/generator 80 (M/G A). Regenerative braking is accomplished using motor/generator 82 (M/G B), which has a direct gear ratio to the output member 18.

The powertrain 10 transitions between the forward electrically-variable low range operating mode established by engagement of torque-transmitting mechanism C1A, and the forward electrically-variable low range operating mode established by engagement of torque-transmitting mechanism C1B through a clutch-to-clutch shift between torque-transmitting mechanisms C1A and C1B.

First Forward Electrically-Variable High Range Operating Mode

To establish a forward electrically-variable high range operating mode, torque-transmitting mechanism C2 is engaged and all other torque-transmitting mechanisms, including torque-transmitting mechanisms C1A and C1B, are open. Power flow is in the forward direction as long as both motor/generators 80 and 82 (M/G A and M/G B) have positive speed. In this operating mode, motor/generator 82 (M/G B) acts as a generator and motor/generator 80 (M/G A) acts as a motor. If the speed of motor/generator 82 (M/G B) is negative, motor/generator 80 (M/G A) becomes a generator to supply power to motor/generator 82 (M/G B). If the speed of motor/generator 80 (M/G A) is negative, motor/generator 82 (M/G B) becomes a generator to supply power to motor/generator 80 (M/G A). This operating mode is a compound-split operating mode, as power is first split through lever 20, with engine power provided at node B and the motor/generators 80, 82 providing power to or receiving power from nodes C and A, respectively, and then split through lever 30, with engine power provided at node E and motor/generator 82 providing power to or receiving power from node D.

Regenerative braking is accomplished during this operating mode by using the controller (described above) to balance engine 12, motor/generator 80 (M/G A), and motor/generator 82 (M/G B) torque during braking to provide the desired deceleration rate of the output member 18. The embodiments of FIGS. 5-9, which will be described in further detail below, also provide a second forward electrically-variable high range operating mode Reverse Electrically-Variable Low Range Operating Mode The powertrain 10 is capable of launching a vehicle in reverse either with engine 12 off or with engine 12 running. If the engine 12 is off, torque-transmitting mechanism C5 is engaged and motor/generator 82 is used to launch the vehicle through the reverse reduction gear ratio provided by lever 30. The engine 12 remains at zero speed and motor/generator 80 spins in the reverse direction. To start the engine 12, motor/generator 80 decelerates to zero speed while motor/generator 82 provides reaction torque as well as torque to drive the vehicle. This accelerates the engine 12 to a speed where it may be fueled. Once the engine 12 is running, engine power is split through the lever 20 and motor/generator 80, which generates power while motor/generator 82 motors. Power is transmitted to the output member 18 through both a mechanical and an electrical path. Power flow is in the forward direction (non-circulating) as long as motor/generator 80 has positive speed. When the speed of motor/generator 80 is negative, motor/generator 82 acts as a generator to supply power to motor/generator 80.

Forward Fixed Speed Ratio Modes

The transmission 10 of FIG. 1 provides nine forward fixed speed ratio (also referred to as a gear ratio) modes, each having a different associated numerical speed ratio (defined as the ratio of the speed of the input member 16 to the speed of the output member 18) assuming that optional torque-transmitting mechanisms C3, C4 and C6 are provided. During an electrically-variable mode, once the numerical speed ratio reaches the value of one of the fixed speed ratios, the appropriate clutches necessary to establish the fixed speed ratio mode may be engaged synchronously. When in a fixed speed ratio mode, the motor/generators 80, 82 are not needed to transmit engine torque but may be used for acceleration boost or regenerative braking. A number of fixed speed ratio modes are possible depending on the included clutches. The combinations of clutches that provide fixed speed ratio modes are:

C1A & C4; C1A & C6; C1A & C2; C1B & C4; C1B & C6; C1B & C2; C2 & C6; C2 & C4; C2 & C3

Since torque-transmitting mechanisms C1A, C1B, and C2 are not optional, the two fixed speed ratio modes that result from applying these torque-transmitting mechanisms are always available. These fixed speed ratios are at the boundary of the corresponding electrically-variable modes established by engagement of C1A (first forward electrically-variable low-range mode) and C2 (first forward electrically-variable high range mode), or of C1B (second forward electrically-variable low range mode) and C2 (first forward electrically-variable high range mode), respectively.

Reverse Fixed Speed Ratio Mode

If the transmission 10 includes optional torque-transmitting mechanism C4, it may be engaged synchronously during the reverse electrically-variable operating mode once the transmission reaches the numerical reverse fixed speed ratio so that both torque-transmitting mechanisms C4 and C5 are engaged, establishing a reverse fixed speed ratio mode. When operating in the reverse fixed speed ratio mode, the motor/generators 80, 82 are not needed to transmit engine torque but may be used for acceleration boost or regenerative braking.

Electric-Only Cruise or Regenerative Braking Mode

The transmission 10 provides an electric-only operating mode suitable for electric-only cruise (i.e., powered only by the battery through the motor/generators) or regenerative braking. If torque-transmitting mechanism C5 is applied while the transmission 10 is in the forward, electrically-variable high range operating mode with C2 closed and C1A and C1B open, and engine fuel is cut off, the engine 12 is stopped and the electric motor/generators 80 and 82 drive the output member 18 with high ratio and additive torque. This operating mode provides excellent motor efficiency for low speed, electric-only operation or regenerative braking. In addition, both motor/generators 80, 82 are spinning at high speed relative to the transmission output member 18, and both decelerate in order to start the engine 12, so battery energy (i.e., energy stored in a battery connected with the motor/generators 80, 82) is augmented by kinetic energy stored in the motor/generators 80, 82 during this maneuver.

Figure 2:
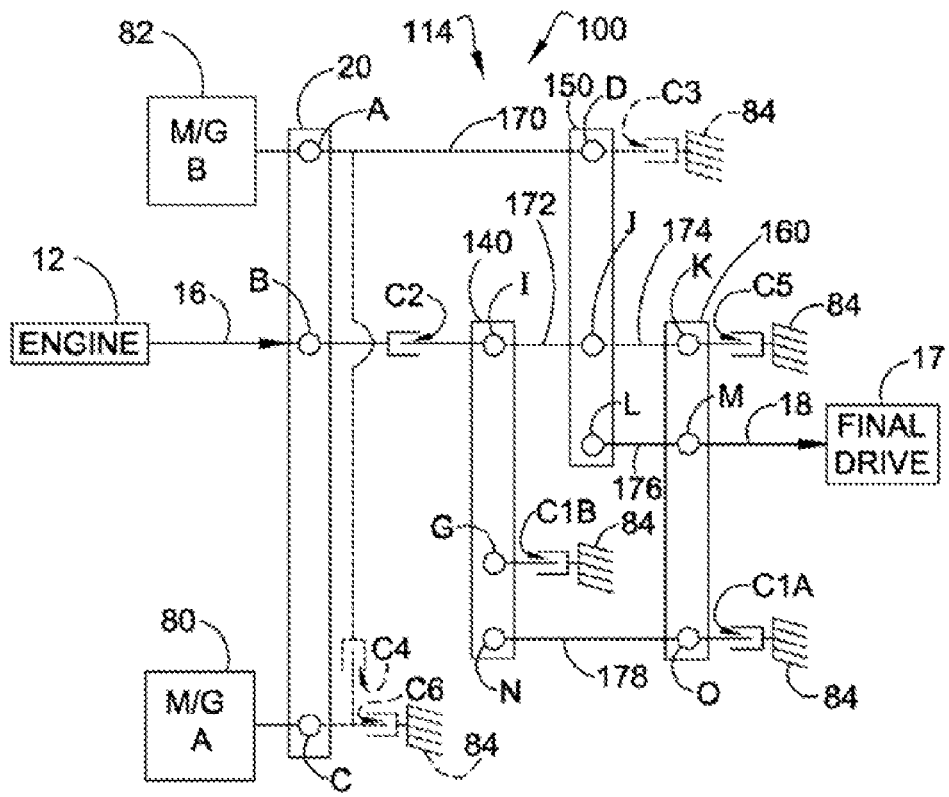
FIG. 2 is an embodiment of the transmission of FIG. 1, with the five-node lever represented by three three-node levers not in collapsed form.

Referring to FIG. 2, another embodiment of a powertrain 100 including engine 12 connected to a transmission 114 is illustrated. The transmission 114 is shown in lever diagram form and is structured the same as transmission 14 of FIG. 1, but three three-node levers 140, 150 and 160 are used. Lever 140 includes nodes I, G and N. Lever 150 includes nodes D, J and L. Lever 160 includes nodes K, M and O. Interconnecting member 170 continuously connects node A for common rotation with node D. Interconnecting member 172 continuously connects node I for common rotation with node J. Interconnecting member 174 continuously connects node J for common rotation with node K. Interconnecting member 176 continuously connects node L for common rotation with node M. Interconnecting member 178 continuously connects node N for common rotation with node O.

Rotating clutch-type torque-transmitting mechanism C2 is selectively engagable to connect node B with node I. Brake-type torque-transmitting mechanism C5 is selectively engagable to ground node K to the stationary member 84. Brake-type torque-transmitting mechanism C1A is selectively engagable to ground node O to the stationary member 84. Brake-type torque-transmitting mechanism C1B is selectively engagable to ground node G to the stationary member 84. Optional torque-transmitting mechanisms include brake-type torque-transmitting mechanism C3, rotating clutch-type torque-transmitting mechanism C4 and brake-type torque-transmitting mechanism C6. Torque-transmitting mechanism C3 is selectively engagable to ground node D to the stationary member 84. Torque-transmitting mechanism C4 is selectively engagable to connect node A for common rotation with node C. Torque-transmitting mechanism C6 is selectively engagable to ground node C to the stationary member 84. The three three-node levers 140, 150 and 160 may be represented by a five-node lever by collapsing nodes I, J and K as a single node, equivalent to node E of FIG. 1, collapsing nodes L and M together as a single node, equivalent to node F of FIG. 1, and collapsing nodes N and O together as a single node equivalent to node H of FIG. 1. The equivalent five-node lever would thus include nodes D and G, as well as a node representing collapsed node I, J and K, a node representing collapsed nodes L and M, and a node representing collapsed nodes N and O.

The transmission 114 operates the same as is described with respect to the transmission 14 of FIG. 1 to achieve two forward low range, electrically-variable modes (EVT1 and EVT2), a forward high range electrically-variable mode (EVT3), fixed speed ratio modes (reverse: FGREV; forward: FG1, FG2, FG3, FG4 and FG5), a reverse, electrically-variable mode (EVTREV) and electric-only cruise or regenerative braking modes (Batt Only 1, Batt Only 2 and Batt Only 3) as indicated in the table set forth below. Three additional fixed speed ratio modes listed with respect to the description of FIG. 1 but not shown in Table A, are available if optional clutch C4 is provided. The numerical ratios listed assume the following sample ratios: lever 20: 1.67, lever 140: 2; lever 150: 3.0; and lever 160: 1.67.

TABLE A

| Mode | Ratio | C1A | C1B | C2 | C5 | C6 | C3 |
|---|---|---|---|---|---|---|---|
| EVT1 | | | X | | | | |
| Batt Only 1 | | | X | | | | |
| EVT2 | | X | | | | | |
| Batt Only 2 | | X | | | | | |
| FG1 | 2.99 | | X | | | X | |
| FG2 | 2.12 | X | | | | X | |
| EVT3 | | | | X | | | |
| FG3 | 1.599 | X | | X | | | |
| FG4 | 1.25 | | | X | | X | |
| FG5 | 0.75 | | | X | | | X |
| Batt Only 3 | | | | X | X | | |
| EVTREV | | | | | X | | |
| FGREV | −1.87 | | | | X | X | |

Figure 3:
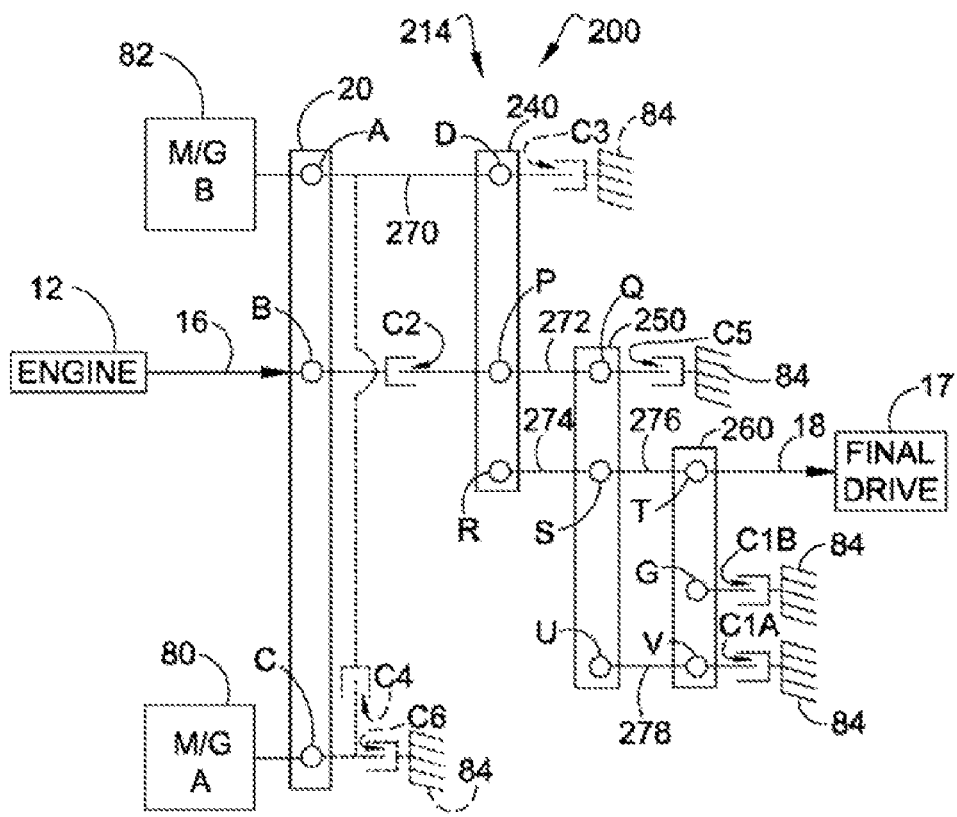
FIG. 3 is another embodiment of the transmission of FIG. 1, with the five-node lever represented by three three-node levers not in collapsed form.

Referring to FIG. 3, another embodiment of a powertrain 200 including engine 12 connected to a transmission 214 is illustrated. The transmission 214 is shown in lever diagram form and is structured the same as transmission 10 of FIG. 1, but three three-node levers 240, 250 and 260 are used. Lever 240 includes nodes D, P and R. Lever 250 includes nodes Q, S and U. Lever 260 includes nodes T, G and V. Interconnecting member 270 continuously connects node A for common rotation with node D. Interconnecting member 272 continuously connects node P for common rotation with node Q. Interconnecting member 274 continuously connects node R for common rotation with node S. Interconnecting member 276 continuously connects node S for common rotation with node T. Interconnecting member 278 continuously connects node U for common rotation with node V.

Rotating clutch-type torque-transmitting mechanism C2 is selectively engagable to connect node B with node P. Brake-type torque-transmitting mechanism C5 is selectively engagable to ground node Q to the stationary member 84. Brake-type torque-transmitting mechanism C1A is selectively engagable to ground node V (and therefore node U) to the stationary member 84. Brake-type torque-transmitting mechanism C1B is selectively engagable to ground node G to the stationary member 84. Optional torque-transmitting mechanisms include brake-type torque-transmitting mechanism C3, rotating clutch-type torque-transmitting mechanism C4 and brake-type torque-transmitting mechanism C6. Torque-transmitting mechanism C3 is selectively engagable to ground node D to the stationary member 84. Torque-transmitting mechanism C4 is selectively engagable to connect node A for common rotation with node C. Torque-transmitting mechanism C6 is selectively engagable to ground node C to the stationary member 84. The three-node levers 240, 250 and 260 may be represented by a five-node lever by collapsing nodes P and Q together as a single node, equivalent to node E of FIG. 1, collapsing nodes R, S and T together as a single node, equivalent to node F of FIG. 1, and collapsing nodes U and V together as a single node equivalent to node H of FIG. 1. The equivalent five-node lever would thus include nodes D and G, as well as a node representing collapsed node P and Q, a node representing collapsed nodes R, S and T and a node representing collapsed nodes U and V.

The transmission 214 operates according to the same engagement schedule as is described with respect to the transmission 14 of FIG. 1 and as is shown in the table set forth above for the transmission 114 of FIG. 2, to achieve the two low range, forward electrically-variable modes, the high range, forward electrically-variable mode, the fixed speed ratio modes, the reverse electrically-variable mode and the electric-only cruise or regenerative braking mode.

Figure 4:
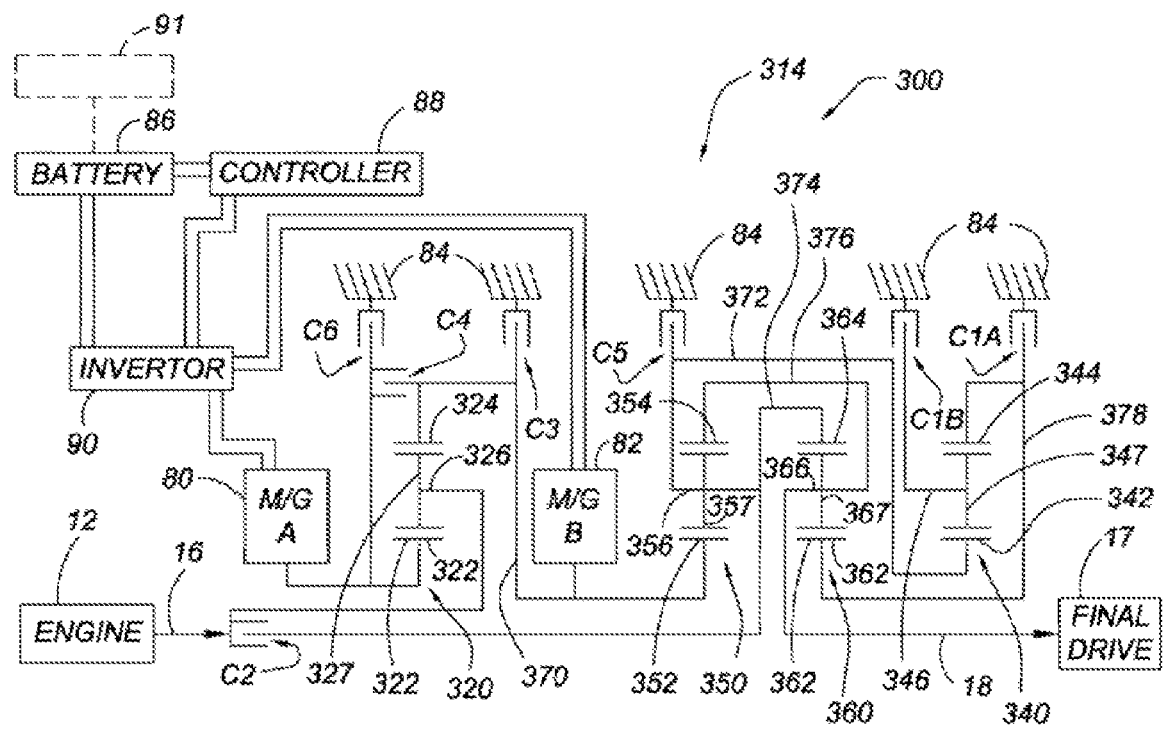
FIG. 4 is an embodiment of the transmission of FIG. 2 in stick-diagram form.

Referring to FIG. 4, a powertrain 300 including engine 12 connected with transmission 314 is illustrated. The transmission 314 is shown in stick-diagram form, and is one embodiment of the transmission 114 of FIG. 2. Lever 20 is represented as a planetary gear set 320. Planetary gear set 320 includes a sun gear member 322, a ring gear member 324, and a carrier member 326 that rotatably supports a plurality of pinion gears 327 that intermesh with both the sun gear member 322 and the ring gear member 324. The three-nodes A, B and C of lever 20 of FIG. 2 are represented as ring gear member 324, carrier member 326 and sun gear member 322 of planetary gear set 320, respectively.

Levers 140, 150 and 160 of the transmission 114 of FIG. 2 are represented as three interconnected planetary gear sets 340, 350 and 360 respectively in the transmission 314 of FIG. 4. Planetary gear set 340 includes sun gear member 342, ring gear member 344, and carrier member 346 that rotatably supports a plurality of pinion gears 347 that intermesh with both the sun gear member 342 and the ring gear member 344. The three nodes N, G and I of lever 140 of FIG. 2 are represented as ring gear member 344, carrier member 346 and sun gear member 342 of planetary gear set 340, respectively.

Planetary gear set 350 includes sun gear member 352, ring gear member 354, and carrier member 356 that rotatably supports a plurality of pinion gears 357 that intermesh with both the sun gear member 352 and the ring gear member 354. The three nodes D, J and L of lever 150 of FIG. 2 are represented as sun gear member 352, carrier member 356 and ring gear member 354, respectively.

Planetary gear set 360 includes sun gear member 362, ring gear member 364, and carrier member 366 that rotatably supports a plurality of pinion gears 367 that intermesh with both the sun gear member 362 and the ring gear member 364. The three nodes K, M and O of lever 160 of FIG. 2 are represented as ring gear member 364, carrier member 366 and sun gear member 362, respectively.

The input member 16 is continuously connected for rotation with the carrier member 326. The output member 18 is continuously connected for rotation with the carrier member 366. Interconnecting member 370 continuously connects ring gear member 324 for rotation with sun gear member 352 and with motor/generator 82. Interconnecting member 372 continuously connects carrier member 356 for rotation with sun gear member 342. Interconnecting member 374 continuously connects carrier member 356 for rotation with ring gear member 364. Interconnecting member 376 continuously connects ring gear member 354 for rotation with carrier member 366. Interconnecting member 378 continuously connects ring gear member 344 for rotation with sun gear member 362. Motor/generator 80 (M/G A) is continuously connected for rotation with sun gear member 322. Motor/generator 82 (M/G B) is continuously connected for rotation with ring gear member 324 and sun gear member 352.

The motor/generators 80, 82 may receive electrical power from or provide electrical power to energy storage device 86, such as a battery. An electronic controller 88 is in signal communication with the battery 86 and with a power invertor 90 that is also in electrical communication with the stator portions of the motor/generators 80, 82. The controller 88 responds to a variety of input signals including vehicle speed, operator demand, the level at which the battery 86 is charged and the power being provided by the engine 12 to regulate the flow of power between the motor/generators 80, 82 and the battery 86 via the inverter 90, which converts between direct current provided or utilized by the battery 86 and alternating current provided or utilized by the stator portions of the motor/generators 80, 82. An optional offboard power supply system 91 may be connected with the battery 86 for recharging of the battery 86. The offboard power supply system is described in detail with respect to FIG. 10A. Alternative offboard power supply systems 91A and 91B are described with respect to FIGS. 10B and 10C, respectively, and either may be connected to battery 86 in lieu of offboard power supply system 91.

Brake-type torque-transmitting mechanism C1A is selectively engagable to ground ring gear member 344 and sun gear member 362 to the stationary member 84. Brake-type torque-transmitting mechanism C1B is selectively engagable to ground carrier member 346 to the stationary member 84. Rotating clutch C2 is selectively engagable to connect the input member 16 (and the carrier member 326) for common rotation with carrier member 356 and ring gear member 364. Brake-type torque-transmitting mechanism C3 is selectively engagable to ground ring gear member 324, sun gear member 352 and motor/generator 82 to the stationary member 84. Rotating clutch-type torque-transmitting mechanism C4 is selectively engagable to connect ring gear member 324 with sun gear member 322 (thereby locking up planetary gear set 320, causing ring gear member 324, sun gear member 322 to rotate at the same speed as carrier member 326 and input member 16). Brake-type torque-transmitting mechanism C5 is selectively engagable to ground the carrier member 356 and the sun gear member 342 to the stationary member 84. Brake-type torque-transmitting mechanism C6 is selectively engagable to ground the sun gear member 322 to the stationary member 84.

The transmission 314 operates according to the same engagement schedule as is described with respect to the transmission 14 of FIG. 1, and as is shown in the table set forth above for the transmission 114 of FIG. 2, to achieve the two forward low range electrically-variable modes, the high range, forward electrically-variable mode, the fixed speed ratio modes, the reverse electrically-variable mode and the electric-only cruise or regenerative braking mode.

Figure 5:
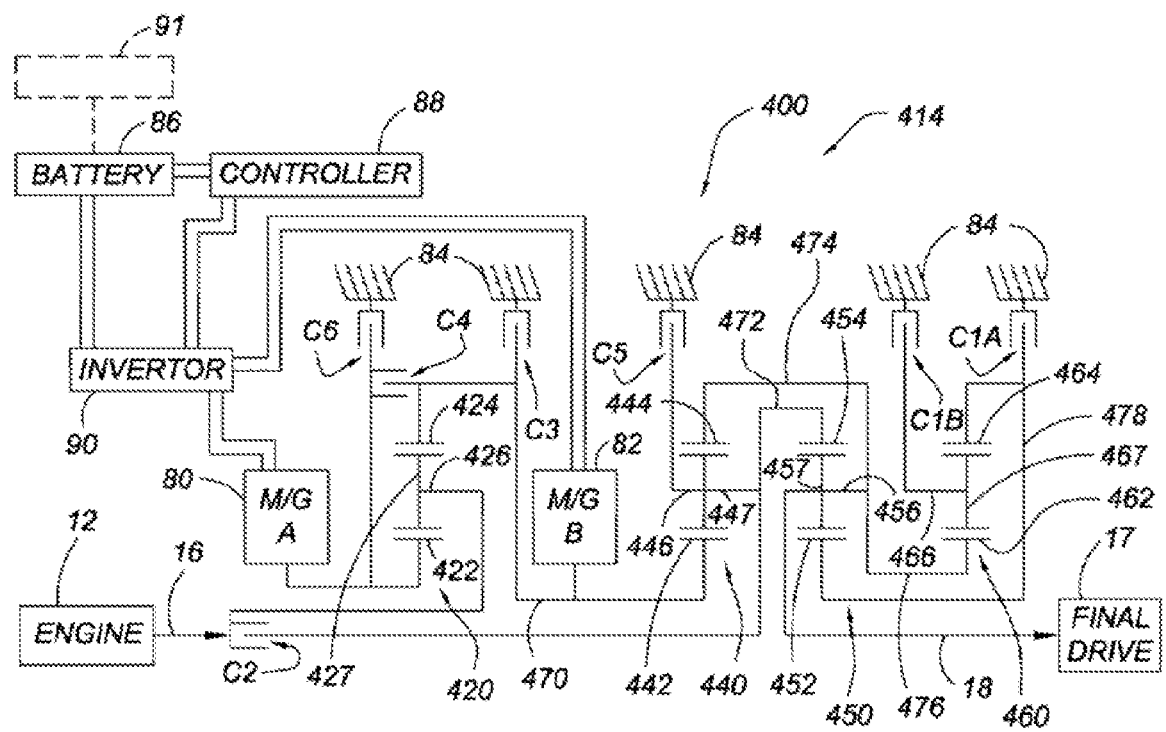
FIG. 5 is an embodiment of the transmission of FIG. 3 in stick-diagram form.

Referring to FIG. 5, a powertrain 400 including engine 12 connected with transmission 414 is illustrated. The transmission 414 is shown in stick-diagram form, and is one embodiment of the transmission 214 of FIG. 3. Lever 20 is represented as a planetary gear set 420. Planetary gear set 420 includes a sun gear member 422, a ring gear member 424, and a carrier member 426 that rotatably supports a plurality of pinion gears 427 that intermesh with both the sun gear member 422 and the ring gear member 424. The three-nodes A, B and C of lever 20 of FIG. 3 are represented as ring gear member 424, carrier member 426, and sun gear member 422 of planetary gear set 420, respectively.

Levers 240, 250 and 260 of the transmission 214 of FIG. 3 are represented as three interconnected planetary gear sets 440, 450 and 460, respectively in the transmission 414 of FIG. 5. Planetary gear set 440 includes sun gear member 442, ring gear member 444, and carrier member 446 that rotatably supports a plurality of pinion gears 447 that intermesh with both the sun gear member 442 and the ring gear member 444. The three nodes R, P and D of lever 240 of FIG. 3 are represented as ring gear member 444, carrier member 446, and sun gear member 442 of planetary gear set 440, respectively.

Planetary gear set 450 includes sun gear member 452, ring gear member 454, and carrier member 456 that rotatably supports a plurality of pinion gears 457 that intermesh with both the sun gear member 452 and the ring gear member 454. The three nodes Q, S and U of lever 450 of FIG. 3 are represented as ring gear member 454, carrier member 456, and sun gear member 452, respectively.

Planetary gear set 460 includes sun gear member 462, ring gear member 464, and carrier member 466 that rotatably supports a plurality of pinion gears 467 that intermesh with both the sun gear member 462 and the ring gear member 464. The three nodes V, G and T of lever 460 of FIG. 3 are represented as ring gear member 464, carrier member 466, and sun gear member 462, respectively.

The input member 16 is continuously connected for rotation with the carrier member 426. The output member 18 is continuously connected for rotation with the carrier member 456. Interconnecting member 470 continuously connects ring gear member 424 for rotation with sun gear member 442 and with motor/generator 82. Interconnecting member 472 continuously connects carrier member 446 for rotation with ring gear member 454. Interconnecting member 474 continuously connects ring gear member 444 for rotation with carrier member 456. Interconnecting member 476 continuously connects carrier member 456 for rotation with sun gear member 462. Interconnecting member 478 continuously connects sun gear member 452 for rotation with ring gear member 464. Motor/generator 80 (M/G A) is continuously connected for rotation with sun gear member 422. Motor/generator 82 (M/G B) is continuously connected for rotation with ring gear member 424 and sun gear member 442. Battery 86, controller 88 and invertor 90 function as described above with respect to FIG. 4. Optional offboard power supply system 91 may be connected with the battery 86 for recharging of the battery 86. The offboard power supply system is described in detail with respect to FIG. 10A. Alternative offboard power supply systems 91A and 91B are described with respect to FIGS. 10B and 10C, respectively, and either may be connected to battery 86 in lieu of offboard power supply system 91.

Brake-type torque-transmitting mechanism C1A is selectively engagable to ground ring gear member 464 and sun gear member 452 to the stationary member 84. Brake-type torque-transmitting mechanism C1B is selectively engagable to ground carrier member 466 to the stationary member 84. Rotating clutch C2 is selectively engagable to connect the input member 16 (and the carrier member 426) for common rotation with carrier member 446 and ring gear member 454. Brake-type torque-transmitting mechanism C3 is selectively engagable to ground ring gear member 424, sun gear member 442 and motor/generator 82 to the stationary member 84. Rotating clutch-type torque-transmitting mechanism C4 is selectively engagable to connect the ring gear member 424 with sun gear member 422 (thereby locking up planetary gear set 420, causing ring gear member 424 and sun gear member 422 to rotate at the same speed as carrier member 426 and input member 16). Brake-type torque-transmitting mechanism C5 is selectively engagable to ground the carrier member 446 and the ring gear member 454 to the stationary member 84. Brake-type torque-transmitting mechanism C6 is selectively engagable to ground the sun gear member 422 to the stationary member 84.

The transmission 414 operates according to the same engagement schedule as is described with respect to the transmission 14 of FIG. 1, and as is shown in the table set forth above for the transmission 114 of FIG. 2, to achieve the two low range, forward electrically-variable modes, the high range, forward electrically-variable mode, the fixed speed ratio modes, the reverse electrically-variable mode and the electric-only cruise or regenerative braking mode.

Figure 6:
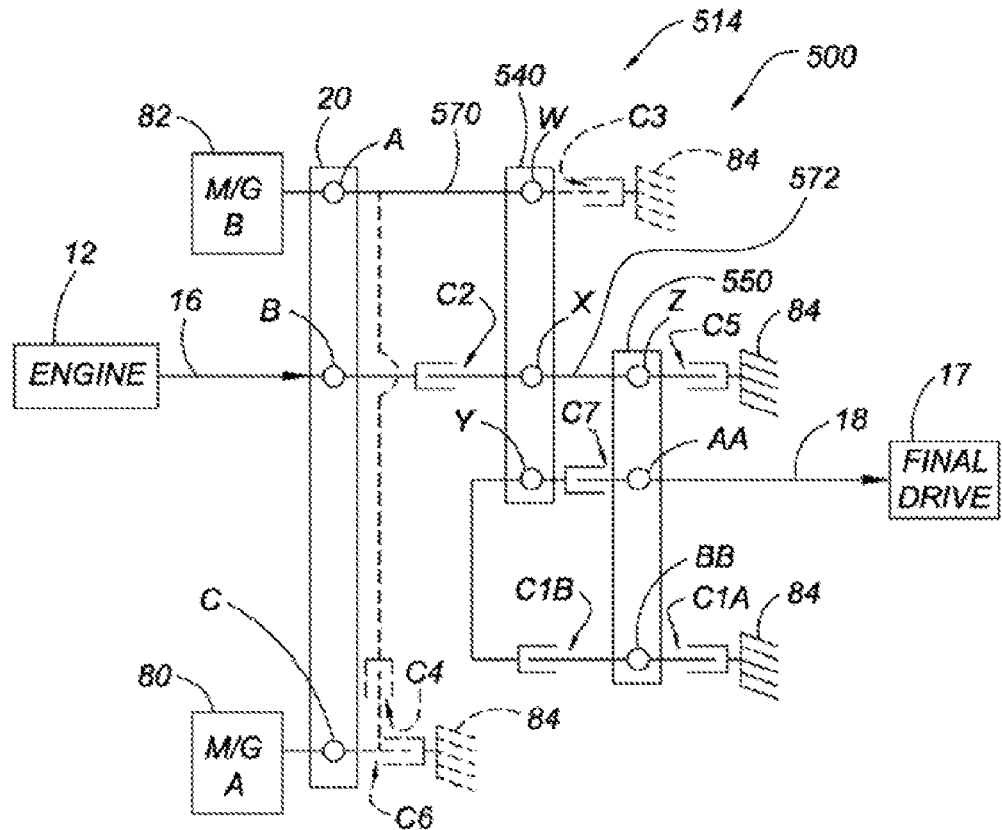
FIG. 6 is a schematic illustration of another transmission in lever diagram form having a three-node lever and two additional three-node levers.

FIG. 6 illustrates a powertrain 500 including an engine 12 connected to an electrically-variable transmission 514. The transmission 514 is designed to receive at least a portion of its driving power from the engine 12 in some of its operating modes, as discussed below. The engine 12 has an output shaft that serves as the input member 16 of the transmission 514. The final drive unit 17 is operatively connected to the output member 18 of the transmission 514.

The transmission 514 includes the three-node lever 20 representing the first, simple planetary gear set having the first, the second and the third member, represented by nodes A, B and C, respectively. The members may be a ring gear member, a sun gear member and a carrier member, although not necessarily in that order. The transmission 514 further includes two three-node levers 540 and 550, representing two interconnected planetary gear sets. Lever 540 includes nodes W, X and Y. Lever 550 includes nodes AA, Z and BB.

The transmission 514 includes fixed interconnections. An interconnecting member 570 connects node A for common rotation with node W. An interconnecting member 572 connects node X for common rotation with node Z. The input member 16 is connected for common rotation with node B. Motor/generator 82 is connected for common rotation with node A. Motor/generator 80 is connected for common rotation with node C. Node AA is connected for common rotation with the output member 18.

The transmission 514 also has several selectively engagable torque-transmitting mechanisms that provide various operating modes as described below. Torque-transmitting mechanism C2 is selectively engagable to connect node B for common rotation with node X. Torque-transmitting mechanism C5 is selectively engagable to ground node Z (and therefore node X due to interconnecting member 572) to the stationary member 84. Torque-transmitting mechanism C1B is selectively engagable to connect node Y for common rotation with node BB. Torque-transmitting mechanism C1A is selectively engagable to ground node BB to the stationary member 84. Finally, torque-transmitting mechanism C7, a rotating clutch, is selectively engagable to connect node Y for common rotation with node AA, and therefore with the output member 18.

The additional, optional torque-transmitting mechanisms described with respect to FIG. 1 may be included to provide additional operating modes, as described below. Optional torque-transmitting mechanism C3 is selectively engagable to ground node W (and therefore node A and motor/generator 82) to the stationary member 84. Optional torque-transmitting mechanism C4 is selectively engagable to connect node A for common rotation with node C. Optional torque-transmitting mechanism C6 is selectively engagable to ground node C to the stationary member 84.

Operational Description

Except as otherwise indicated, the embodiments of FIGS. 6-9 achieve the operational modes according to the engagement schedule set forth in Table B below. The numerical ratios listed assume the following sample ratios: lever 20: 2.5; lever 540: 2.1; and lever 550: 1.8. These operational modes will be described with respect to the embodiment of FIG. 6; the embodiments of FIGS. 7-9 operate in like manner unless otherwise indicated. Four additional fixed speed ratio modes, listed with respect to the description of the forward fixed speed ratio modes below, but not shown in Table B, are also achieved if optional torque-transmitting mechanisms C3 and C4 are provided, for a total of ten fixed forward speed ratio modes.

TABLE B

| Mode | Ratio (Range) | C1A | C1B | C2 | C5 | C6 | C7 |
|---|---|---|---|---|---|---|---|
| EVT1 | 4.8-1.55 | X | X | | | | |
| EVT2 | 2.8-1.55 | X | | | | | X |
| FG1 | 3.44 | X | X | | | X | |
| FG2 | 1.94 | X | | | | X | X |
| EVT3 | .55-1.0 | | | X | | | X |
| FG3A | 1.55 | X | X | X | | | |
| FG3B | 1.55 | X | | X | | | X |
| FG4 | 1.23 | | | X | | X | X |
| FG5 | 1 | | X | X | | | X |
| FG6 | 0.714 | | X | | | X | X |
| EVT4 | 1.0-0.714 | | X | | | | X |
| EVTREV | −5.88 | | X | | X | | |
| Batt Only | 5.25−−2.1 | | | X | X | | X |
| FGREV | −4.2 | | X | | X | X | |

Two Forward Electrically-Variable Low Range Operating Modes

The powertrain 500 is capable of launching a vehicle (not shown) either with engine 12 off or with engine 12 running. The powertrain 500 may launch in either of two forward electrically-variable low range operating modes by engaging both torque-transmitting mechanism C1A and C1B for one of the modes, and by engaging torque-transmitting mechanisms C1A and C7 for the other mode. If the engine 12 is off, torque-transmitting mechanism C1A and C1B (or C7) is engaged and motor/generator 82 (M/G B) is used to launch the vehicle through a reduction gear ratio provided by levers 540 and 550. The engine 12 remains at zero speed and motor/generator 80 (M/G A) spins in the reverse direction. To start the engine 12, motor/generator (M/G A) decelerates to zero speed while motor/generator 82 (M/G B) provides reaction torque as well as torque to drive the vehicle. This accelerates the engine 12 to a speed where it may be fueled. Once the engine 12 is running, engine power is split through lever 20 and motor/generator 80 (M/G A), which generates power while motor/generator 82 (M/G B) motors, to establish an input-split, electrically-variable forward low range operating mode. Power is transmitted to the output member 18 through both a mechanical and an electrical path. The mechanical power path is from the engine 12 to lever 20, then to levers 540 and 550 through interconnecting member 570, then to output member 18. The gear tooth counts of the gear members of the planetary gear sets represented by nodes B, A, W, X, Z and AA of the interconnected levers 540 and 550 provide a reduction ratio, so that the output member 18 rotates at a slower speed than the input member 16, and the motor/generators 80 and 82 vary the speed of rotation of nodes A and C, respectively, to provide a range of speed ratios during the forward electrically-variable mode established by engagement of C1A and C1B (or the alternative forward electrically-variable mode established by engagement of C1A and C7) so that the mode is characterized as an electrically-variable low range mode. The electrical power path is from the motor/generator 80 (M/G A) through node A of lever 20 to node W of lever 540, and then through the lever 550 to the output member 18. Power flow is in the forward direction (non-circulating) as long as motor/generator 80 (M/G A) has positive speed. When the speed of motor/generator 80 (M/G A) is negative, motor/generator 82 (M/G B) acts as a generator to supply power to motor/generator 80 (M/G A). Regenerative braking is accomplished using motor/generator 82 (M/G B), which has a direct ratio to the output.

The powertrain 500 transitions between the forward electrically-variable low range operating mode established by engagement of torque-transmitting mechanisms C1A and C1B, and the forward electrically-variable low range operating mode established by engagement of torque-transmitting mechanism C1A and C7 through a clutch-to-clutch shift between the torque-transmitting mechanisms.

First Forward Electrically-Variable High Range Operating Mode

To establish a forward electrically-variable high range operating mode, torque-transmitting mechanisms C2 and C7 are engaged and all other torque-transmitting mechanisms, including torque-transmitting mechanisms C1A and C1B, are open. Power flow is in the forward direction as long as both motor/generators 80 and 82 (M/G A and M/G B) have positive speed. As used herein, a motor/generator has "positive speed" when it rotates in the same direction as the input shaft. In this operating mode, motor/generator 82 (M/G B) acts as a generator and motor/generator 80 (M/G A) acts as a motor. If the speed of motor/generator 82 (M/G B) is negative, motor/generator 80 (M/G A) becomes a generator to supply power to motor/generator 82 (M/G B). If the speed of motor/generator 80 (M/G A) is negative, motor/generator 82 (M/G B) becomes a motor to utilize power from motor/generator 80 (M/G A). This operating mode is a compound-split operating mode, as power is first split through lever 20, with engine power provided at node B and the motor/generators 80, 82 providing power to or receiving power from nodes C and A, respectively, and then split through lever 540, with engine power provided at node X and motor/generator 82 providing power to or receiving power from node W.

Regenerative braking is accomplished during this operating mode by using a controller to balance engine 12, motor/generator 80 (M/G A), and motor/generator 82 (M/G B) torque during braking to provide the desired deceleration rate of the output member 18.

Second Forward Electrically-Variable High Range Operating Mode

The powertrain 500 of FIG. 6, as well as the powertrains of embodiments of FIGS. 7-9, which will be described in further detail below, also provides a second forward electrically-variable high range operating mode, which may be entered with a synchronous shift at transmission ratio 1.0. For operation in this second forward electrically-variable high range operating mode, the transmission 514 operates in an input-split mode, with torque-transmitting mechanisms C7 and C1B engaged, and all other torque-transmitting mechanisms open. Power flow is in the forward direction as long as the motor/generators 80, 82 have positive speed. In this range, motor/generator 80 (M/G A) acts as a generator and motor/generator 82 (M/G B) acts as a motor. If the speed of motor/generator 80 (M/G A) is negative, motor/generator 82 (M/G B) becomes a generator to supply power to motor/generator 80 (M/G A). Regenerative braking may accomplished by using the controller to balance the torque of the engine 12, the motor/generator 80 (M/G A), and the motor/generator 82 (M/G B) to provide the desired deceleration rate of the output member 18. Alternately, the engine 12 may be shut off and regeneration performed through motor/generator 82 (M/G B) only. This alternative thus provides the ability to lock up planetary gear sets represented by levers 540 and 550 at a 1:1 direct drive ratio by closing clutches C1B and C7 simultaneously. This forward high range, electrically-variable mode range is an input-split mode that is efficient for highway cruising at transmission ratios less than 1.0. Engaging torque-transmitting mechanism C2 in addition to torque-transmitting mechanisms C1B and C7 locks up the planetary gear set represented by lever 20, providing a fixed speed ratio of 1.0 through the entire transmission 514 (i.e., direct drive), which duplicates some of the functionality provided by clutch C4, thereby possibly allowing it to be eliminated.

Reverse Electrically-Variable Low Range Operating Mode

The powertrain 500 is capable of launching a vehicle in reverse either with engine 12 off or with engine 12 running. If the engine 12 is off, torque-transmitting mechanisms C1B and C5 are engaged and motor/generator 82 is used to launch the vehicle through the reverse reduction gear ratio provided by levers 540 and 550. The engine 12 remains at zero speed and motor/generator 80 spins in the reverse direction. To start the engine 12, motor/generator 80 decelerates to zero speed while motor/generator 82 provides reaction torque as well as torque to drive the vehicle. This accelerates the engine 12 to a speed where it may be fueled. Once the engine 12 is running, engine power is split through the lever 20 and motor/generator 80, which generates power while motor/generator 82 motors. Power is transmitted to the output member 18 through both a mechanical and electrical path. Power flow is in the forward direction (non-circulating) as long as motor/generator 80 has positive speed. When the speed of motor/generator 80 is negative, motor/generator 82 acts as a generator to supply power to motor/generator 80. Alternatively, engagement of C1B and C7 allow vehicle launch utilizing the engine 12 and motor/generators 80, 82 in a reverse electrically-variable mode.

Forward Fixed Speed Ratio Modes

The transmission 514 of FIG. 6 provides the six fixed forward speed ratio modes, as set forth in the table above, as well as four additional fixed speed ratios assuming that optional torque-transmitting mechanisms C3 and C4 are provided, for a total of ten forward fixed speed ratio modes as listed below. The fixed speed ratios FG3A and FG3B are alternate ways of achieving the same speed ratio. During an electrically-variable mode, once the numerical speed ratio reaches the value of one of the fixed speed ratios, the appropriate clutches may be engaged synchronously. When at the fixed speed ratio, the motor/generators 80, 82 are not needed to transmit engine torque but may be used for acceleration boost or regenerative braking. Assuming all optional torque-transmitting mechanisms shown in FIG. 6 are included, the following ten forward fixed speed ratio modes may be achieved.

C1A, C7 & C4; C1A, C7 & C6; C1A, C7 & C2; C1A, C1B & C4;

C1A, C1B & C6; C1A, C1B & C2; C2, C7 & C6; C2, C7 & C4; C2,

C7 & C3; C2, C7 & C1B

Since clutches C1A, C1B, C2 and C7 are not optional, the fixed speed ratio modes that result from applying these clutches are always available. These fixed speed ratios are at the boundary of the corresponding electrically-variable modes established by engagement of C1A and C1B; C1A and C7; C2 and C7; and C1B and C7, respectively.

Reverse Fixed Speed Ratio Mode

If the transmission 514 includes optional torque-transmitting mechanism C6, it may be engaged synchronously during the reverse electrically-variable operating mode once the transmission ratio reaches the fixed speed ratio so that torque-transmitting mechanisms C1B, C5 and C6 are engaged to establish the reverse fixed speed ratio mode (FGREV). When in the reverse fixed speed ratio mode, the motor/generators 80, 82 are not needed to transmit engine torque but may be used for acceleration boost or regenerative braking.

Electric-Only Cruise or Regenerative Braking Mode

The transmission 514 provides an electric-only operating mode suitable for electric-only cruise (i.e., powered only by the battery through the motor/generators) or regenerative braking. If torque-transmitting mechanism C5 is applied while the transmission 514 is in the first forward, high range electrically-variable operating mode with C2 and C7 engaged, and engine fuel is cut off, the engine 12 is stopped and the electric motor/generators 80 and 82 drive the output member 18 with high ratio and additive torque. This operating mode provides excellent motor efficiency for low speed, electric-only operation or regenerative braking. In addition, both motor/generators 80, 82 are spinning at high speed relative to the transmission output member 18, and both decelerate in order to start the engine 12, so battery energy (i.e., energy stored in a battery connected with the motor/generators 80, 82) is augmented by kinetic energy stored in the motor/generators 80, 82 during this maneuver.

Figure 7:
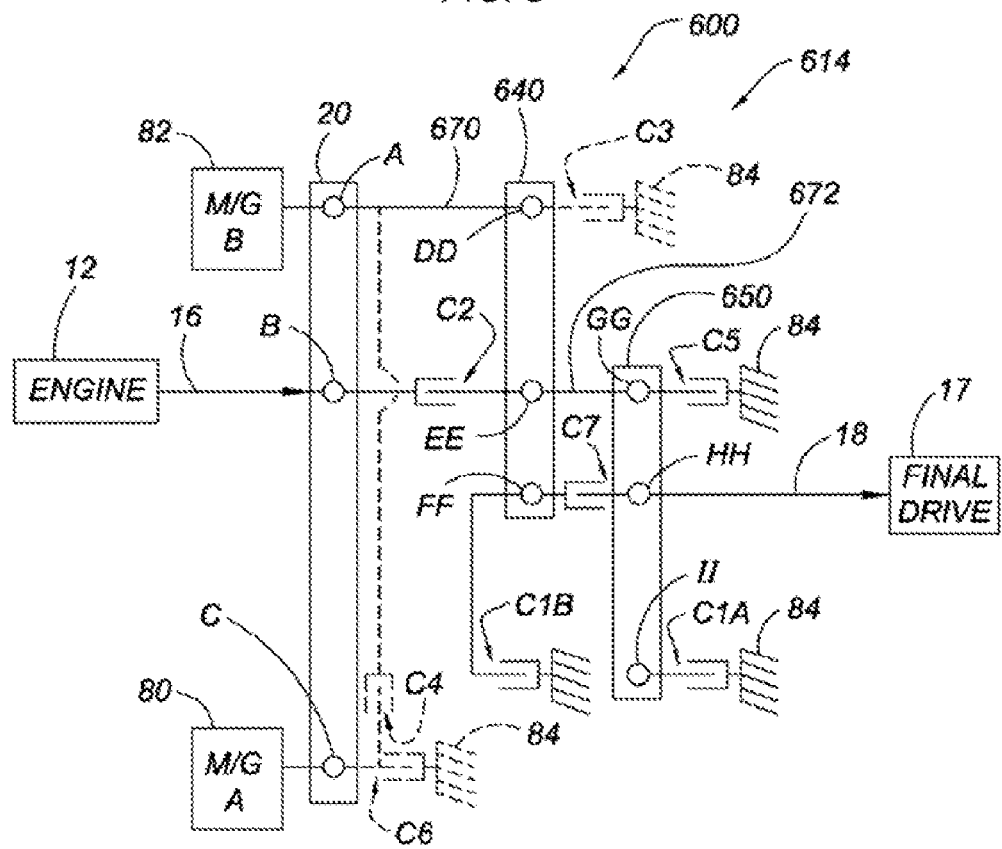
FIG. 7 is a schematic illustration of another transmission in lever diagram form having a three-node lever and two additional three-node levers.

FIG. 7 illustrates a powertrain 600 including engine 12 connected to another embodiment of an electrically-variable transmission 614. The powertrain 600 achieves a subset of the operating modes as the powertrain 500 discussed above. The engine 12 has an output shaft that serves as the input member 16 of the transmission 614. The final drive unit 17 is operatively connected to the output member 18 of the transmission 614.

The transmission 614 includes the three-node lever 20 representing a first, simple planetary gear set having a first, a second and a third member, represented by nodes A, B and C, respectively. The members may be a ring gear member, a sun gear member and a carrier member, although not necessarily in that order. The transmission 614 further includes two three-node levers 640 and 650, representing two interconnected planetary gear sets. Lever 640 includes nodes DD, EE and FF. Lever 650 includes nodes GG, HH and II.

The transmission 614 includes fixed interconnections. An interconnecting member 670 connects node A for common rotation with node DD. An interconnecting member 672 connects node EE for common rotation with node GG. The input member 16 is connected for common rotation with node B. Motor/generator 82 is connected for rotation with node A. Motor/generator 80 is connected for rotation with node C. Node HH is connected for common rotation with the output member 18.

The transmission 614 also has several selectively engagable torque-transmitting mechanisms that provide various operating modes as described below. Torque-transmitting mechanism C2 is selectively engagable to connect node B for common rotation with node EE. Torque-transmitting mechanism C5 is selectively engagable to ground node GG (and therefore node EE due to interconnecting member 672) to the stationary member 84. Torque-transmitting mechanism C1B is selectively engagable to ground node FF to the stationary member 84. While the brake-type torque-transmitting mechanism C1B is simpler in that it does not require C1B to be a rotating clutch, as in transmission 514 of FIG. 6, this alternative does not provide the second forward high range electrically-variable mode and the direct drive fixed speed (gear ratio of 1.0). However, a fixed gear ratio of 1.0 will still be available if optional torque-transmitting mechanism C4 is included. Torque-transmitting mechanism C1A is selectively engagable to ground node II to the stationary member 84. Finally, torque-transmitting mechanism C7 is selectively engagable to connect node FF for common rotation with node HH, and therefore with the output member 18.

Additional, optional torque-transmitting mechanisms may be included to provide additional operating modes, as described below. Optional torque-transmitting mechanism C3 is selectively engagable to ground node DD (and therefore node A and motor/generator 82) to the stationary member 84. Optional torque-transmitting mechanism C4 is selectively engagable to connect node A for common rotation with node C, causing all members of the planetary gear set represented by lever 20 to rotate at the same speed, thus functioning as a lock-up clutch. Optional torque-transmitting mechanism C6 is selectively engagable to ground node C to the stationary member 84. The transmission 614 operates according to the same engagement schedule as is described with respect to the transmission 514 of FIG. 6, and as is shown in Table B for the transmission 514 of FIG. 6, to achieve the two forward low range, electrically-variable modes, the first forward high range, electrically-variable mode (EVT3), the fixed speed ratio modes (except FG5 because torque-transmitting mechanism C1B is not a rotating-type clutch), the reverse electrically-variable mode and the electric-only cruise or regenerative braking mode.

Figure 8:
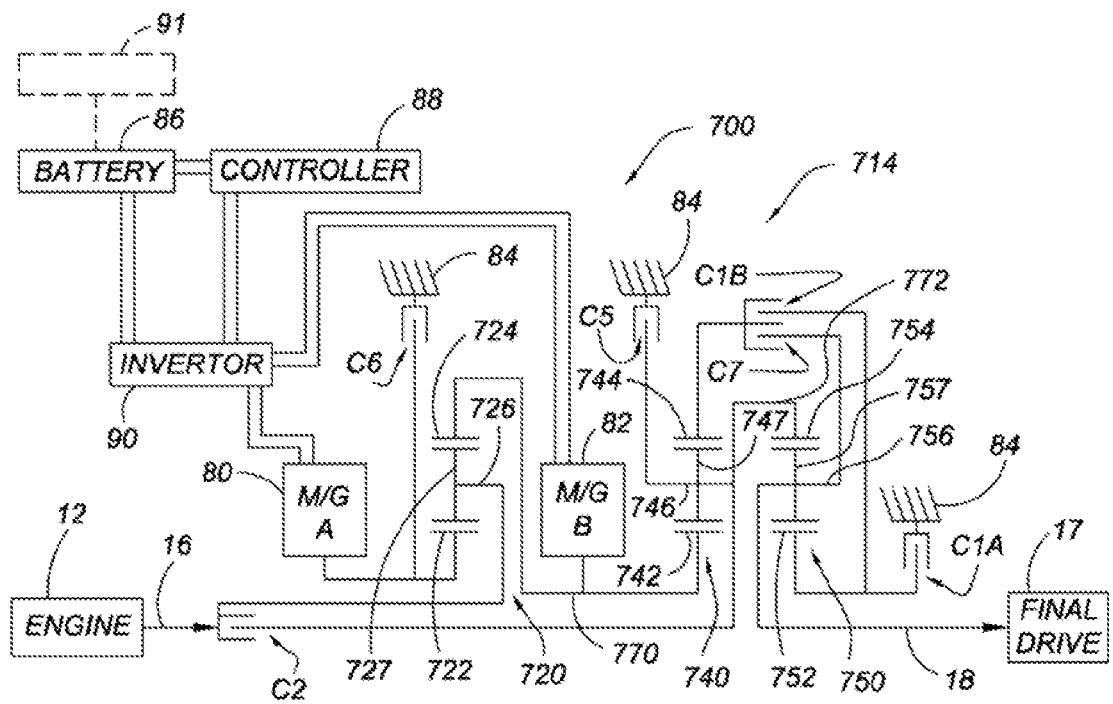
FIG. 8 is an embodiment of the transmission of FIG. 6 in stick diagram form.

Referring to FIG. 8, a powertrain 700 including engine 12 connected with transmission 714 is illustrated. The transmission 714 is shown in stick-diagram form, and is one embodiment of the transmission 514 of FIG. 6. Lever 20 is represented as a planetary gear set 720. Planetary gear set 720 includes sun gear member 722, ring gear member 724, and carrier member 726 that rotatably supports a plurality of pinion gears 727 that intermesh with both the sun gear member 722 and the ring gear member 724. The three-nodes A, B and C of lever 20 of FIG. 6 are represented as ring gear member 724, carrier member 726 and sun gear member 722 of planetary gear set 720, respectively.

Levers 540 and 550 of the transmission 514 of FIG. 6 are represented as two interconnected planetary gear sets 740 and 750, respectively, in the transmission 714 of FIG. 8. Planetary gear set 740 includes sun gear member 742, ring gear member 744, and carrier member 746 that rotatably supports a plurality of pinion gears 747 that intermesh with both the sun gear member 742 and the ring gear member 744. The three nodes Y, X and W of lever 540 of FIG. 6 are represented as ring gear member 744, carrier member 746 and sun gear member 742 of planetary gear set 740, respectively.

Planetary gear set 750 includes sun gear member 752, ring gear member 754, and carrier member 756 that rotatably supports a plurality of pinion gears 757 that intermesh with both the sun gear member 752 and the ring gear member 754. The three nodes Z, AA and BB of lever 550 of FIG. 6 are represented as ring gear member 754, carrier member 756 and sun gear member 752, respectively.

The input member 16 is continuously connected for rotation with the carrier member 726. The output member 18 is continuously connected for rotation with the carrier member 756. Interconnecting member 770 continuously connects ring gear member 724 for rotation with sun gear member 742 and with motor/generator 82. Interconnecting member 772 continuously connects carrier member 746 for rotation with ring gear member 754. Motor/generator 80 (M/G A) is continuously connected for rotation with sun gear member 722. Motor/generator 82 (M/G B) is continuously connected for rotation with ring gear member 724 and sun gear member 742. The battery 86, controller 88, and invertor 90 function as described above with respect to FIG. 4. Optional offboard power supply system 91 may be connected with the battery 86 for recharging of the battery 86. The offboard power supply system is described in detail with respect to FIG. 10A. Alternative offboard power supply systems 91A and 91B are described with respect to FIGS. 10B and 10C, respectively, and either may be connected to battery 86 in lieu of offboard power supply system 91.

Brake-type torque-transmitting mechanism C1A is selectively engagable to ground sun gear member 752 to the stationary member 84. Rotating clutch-type torque-transmitting mechanism C1B is selectively engagable to connect ring gear member 744 for common rotation with sun gear member 752. Rotating clutch C2 is selectively engagable to connect the input member 16 (and the carrier member 726) for common rotation with carrier member 746 and ring gear member 754. Brake-type torque-transmitting mechanism C5 is selectively engagable to ground the carrier member 746 and the ring gear member 754 to the stationary member 84. Brake-type torque-transmitting mechanism C6 is selectively engagable to ground the sun gear member 722 to the stationary member 84. Rotating clutch-type torque-transmitting mechanism C7 is selectively engagable to connect ring gear member 744 for common rotation with carrier member 756. Torque-transmitting mechanism C7 allows ring gear member 744 to be disconnected from carrier member 756, and therefore from the output member 18. Rotating clutch C1B, when engaged along with torque-transmitting mechanism C1A, connects ring member 744 to stationary member 84. This allows planetary gear sets 740 and 750 to function as cascaded reduction stages, allowing for a large reduction ratio in the range of 4.5 to 5.5 between motor/generator 82 (M/G B) and the output member 18.

The transmission 714 operates according to the same engagement schedule as is described with respect to the transmission 514 of FIG. 6, and as is shown in the Table B set forth above, to achieve two forward low range, electrically-variable modes, two forward high range, electrically-variable modes, the reverse electrically-variable mode and the electric-only cruise or regenerative braking mode.

Figure 9:
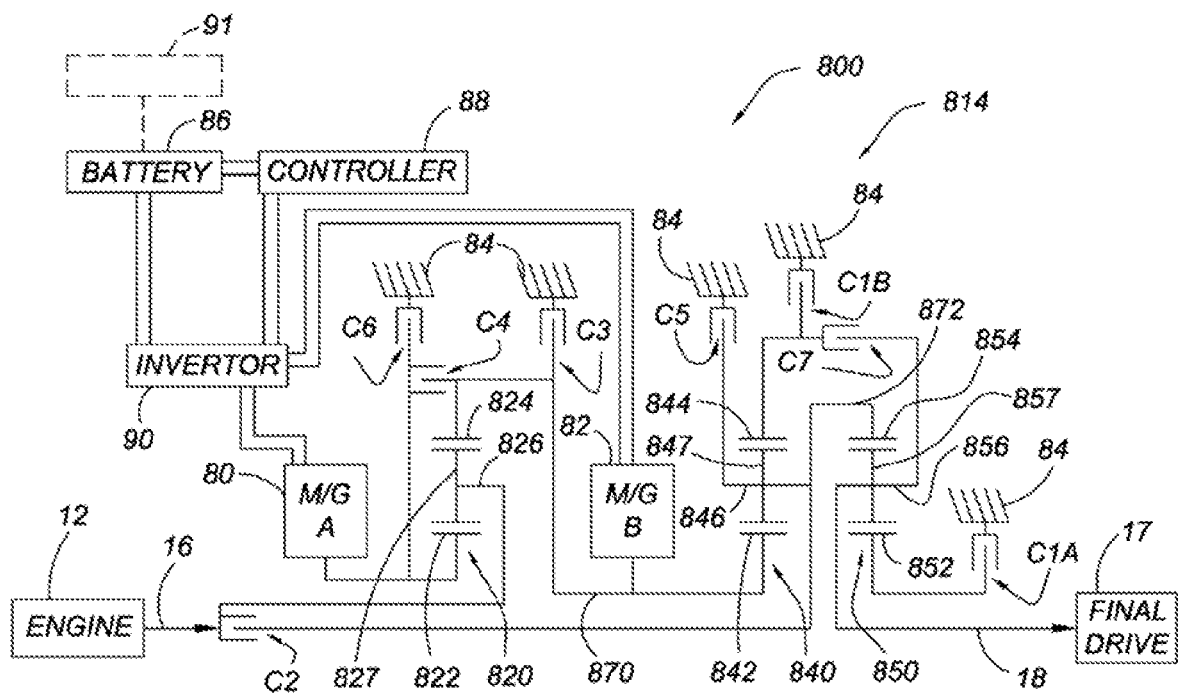
FIG. 9 is an embodiment of the transmission of FIG. 7 in stick diagram form.

Referring to FIG. 9, a powertrain 800 including engine 12 connected with transmission 814 is illustrated. The transmission 814 is shown in stick-diagram form, and is one embodiment of the transmission 614 of FIG. 7. Lever 20 is represented as a planetary gear set 820. Planetary gear set 820 includes sun gear member 822, ring gear member 824, and carrier member 826 that rotatably supports a plurality of pinion gears 827 that intermesh with both the sun gear member 822 and the ring gear member 824. The three-nodes A, B and C of lever 20 of FIG. 7 are represented as ring gear member 824, carrier member 826 and sun gear member 822 of planetary gear set 820, respectively.

Levers 640 and 650 of the transmission 814 of FIG. 7 are represented as two interconnected planetary gear sets 840 and 850, respectively, in the transmission 814 of FIG. 9. Planetary gear set 840 includes sun gear member 842, ring gear member 844, and carrier member 846 that rotatably supports a plurality of pinion gears 847 that intermesh with both the sun gear member 842 and the ring gear member 844. The three nodes FF, EE and DD of lever 640 of FIG. 7 are represented as ring gear member 844, carrier member 846 and sun gear member 842 of planetary gear set 840, respectively.

Planetary gear set 850 includes a sun gear member 852, a ring gear member 854, and a carrier member 856 that rotatably supports a plurality of pinion gears 857 that intermesh with both the sun gear member 852 and the ring gear member 854. The three nodes GG, HH and II of lever 650 of FIG. 7 are represented as ring gear member 854, carrier member 856 and sun gear member 852, respectively.

The input member 16 is continuously connected for rotation with the carrier member 826. The output member 18 is continuously connected for rotation with the carrier member 856. Interconnecting member 870 continuously connects ring gear member 824 for rotation with sun gear member 842 and with motor/generator 82. Interconnecting member 872 continuously connects carrier member 846 for rotation with ring gear member 854. Motor/generator 80 (M/G A) is continuously connected for rotation with sun gear member 822. Motor/generator 82 (M/G B) is continuously connected for rotation with ring gear member 824 and sun gear member 842. The battery 86, controller 88, and invertor 90 function as described above with respect to FIG. 4. Optional offboard power supply system 91 may be connected with the battery 86 for recharging of the battery 86. The offboard power supply system is described in detail with respect to FIG. 10A. Alternative offboard power supply systems 91A and 91B are described with respect to FIGS. 10B and 10C, respectively, and either may be connected to battery 86 in lieu of offboard power supply system 91.

Brake-type torque-transmitting mechanism C1A is selectively engagable to ground sun gear member 852 to the stationary member 84. Brake-type torque-transmitting mechanism C1B is selectively engagable to ground ring gear member 844 to stationary member 84. Rotating clutch-type torque-transmitting mechanism C2 is selectively engagable to connect the input member 16 (and the carrier member 826) for common rotation with carrier member 846 and ring gear member 854. Brake-type torque-transmitting mechanism C3 is selectively engagable to ground the ring gear member 824 and the sun gear member 842 to stationary member 84. Rotating clutch-type torque-transmitting mechanism C4 is selectively engagable to connect ring gear member 824 with sun gear member 822 (thereby locking up planetary gear set 820, causing ring gear member 824, sun gear member 822 to rotate at the same speed as carrier member 826 and input member 18). Brake-type torque-transmitting mechanism C5 is selectively engagable to ground the carrier member 846 and the ring gear member 854 to the stationary member 84. Brake-type torque-transmitting mechanism C6 is selectively engagable to ground the sun gear member 822 to the stationary member 84. Rotating clutch-type torque-transmitting mechanism C7 is selectively engagable to connect ring gear member 844 for common rotation with carrier member 856. Torque-transmitting mechanism C7 allows the ring gear member 844 to be disconnected from carrier member 856, and therefore from the output member 18. Brake-type torque-transmitting mechanism C1B connects ring gear member 844 to stationary member 84. This allows planetary gear sets 840 and 850 to function as cascaded reduction stages, allowing for a large reduction ratio in the range of 4.5 to 5.5 between motor/generator 82 (M/G B) and the output member 18.

The transmission 814 operates according to the same engagement schedule as is described with respect to the transmission 514 of FIG. 6, and as is shown in the Table B set forth above for the transmission 514 of FIG. 6, to achieve two forward low range, electrically-variable modes, the first forward high range, electrically-variable mode (EVT3), the fixed speed ratio modes (except FG5 because torque-transmitting mechanism C1B is not a rotating-type clutch), the reverse electrically-variable mode and the electric-only cruise or regenerative braking mode.

Figure 10A:
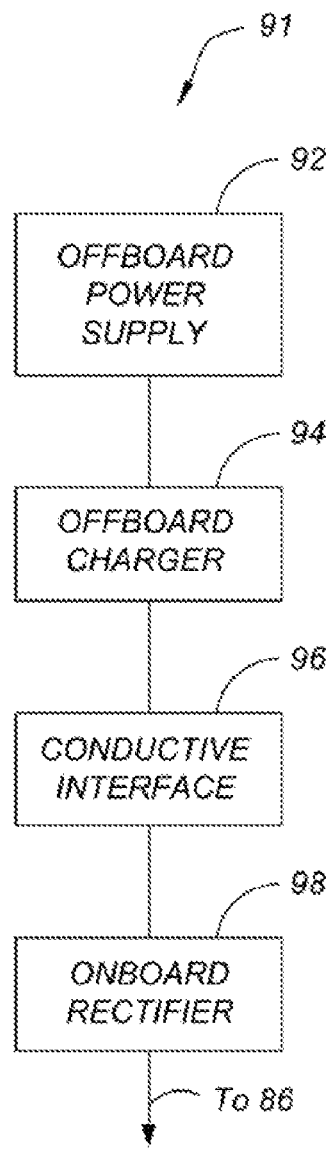
FIGS. 10A-10C are schematic illustrations of different offboard power supply systems for charging a battery used with motor/generators in the transmission embodiments of FIGS. 1-9.

Referring to FIG. 10A, offboard power supply system 91 is illustrated. The offboard power supply system 91 includes an offboard power supply 92 and an offboard charger 94 operatively connected with the offboard power supply 92, both of which are offboard of (i.e., not mounted onboard of) a vehicle having any of the transmission embodiments described herein. Instead, an onboard/offboard conductive interface 96, such as an electrical outlet and plug, permits selective connection of the offboard components (the offboard power supply 92 and offboard charger 94) with onboard battery 86, optionally through an onboard rectifier 98 that is necessary only if the charger 94 supplies alternating current. The transmission embodiments described herein that utilize such an offboard power supply system 91 may be referred to as plug-in hybrid transmissions. The charger 94 is an offboard conductive-type charger that regulates the flow of electrical power from the offboard power supply 92 to the battery 86. When the battery 86 is sufficiently recharged, the connection through interface 96 is terminated, and the recharged battery 86 is then used as discussed herein to power the motor/generators 80, 82, such as in the electric-only mode.

Figure 10B:
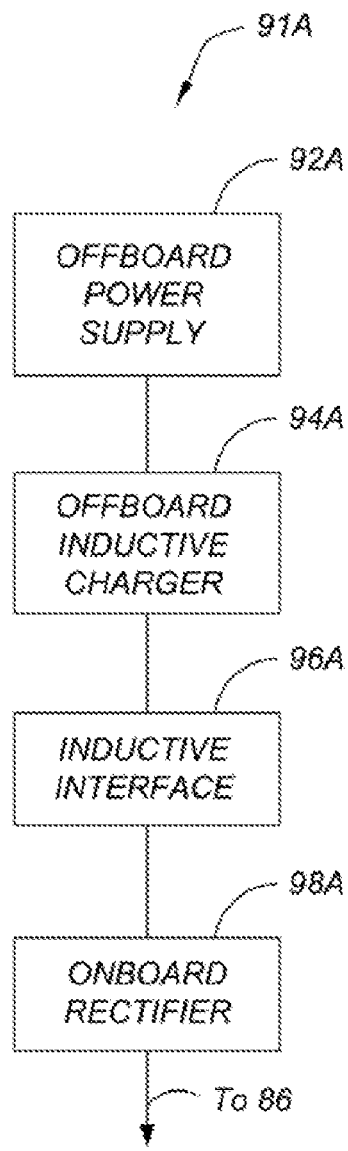

Referring to FIG. 10B, an alternate offboard power supply system 91A is illustrated using an offboard inductive-type charger 94A to regulate the flow of power from an offboard power supply 92A, through an onboard/offboard inductive interface 96A, to battery 86. Powerflow from the inductive interface 96A is optionally through an onboard rectifier 98A, which is required if the charger 94A provides alternating current. The offboard inductive charger 94A may be an electrical coil that establishes a magnetic field when powered by the offboard power supply 92A. The inductive interface 96A may be a complementary coil that connects the offboard components (offboard power supply 92A and offboard inductive charger 94A) with the onboard components (onboard rectifier 98A and battery 86) when positioned close enough to the offboard inductive charger 94A during recharging to allow a magnetic field generated by electrical power flowing in the inductive charger 94A to cause electrical power to flow to the onboard rectifier 98A and then to the battery 86. When the battery 86 is sufficiently recharged, the inductive interface 96A is no longer positioned near the offboard inductive charger 94A, and the recharged battery 86 is then used as discussed herein to power the motor/generators 80, 82, such as in the electric-only mode.

Figure 10C:
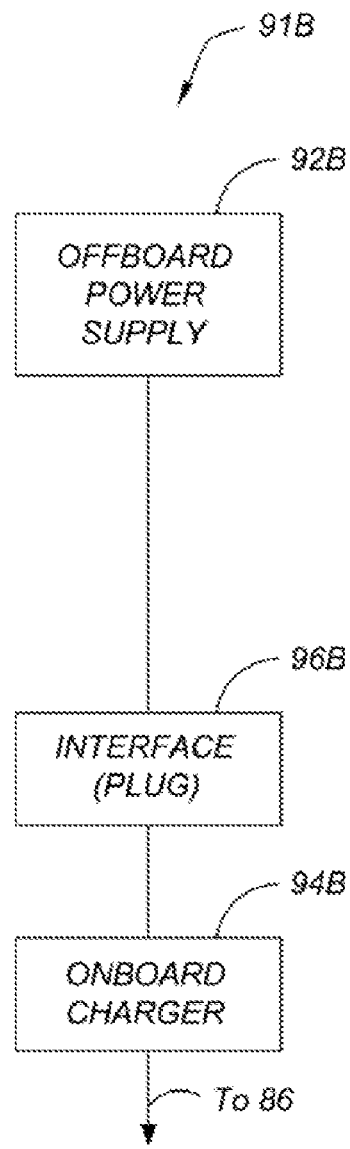

Referring to FIG. 10C, an alternate offboard power supply system 91C is illustrated using an offboard power supply 92B, an onboard charger 94B, and an onboard/offboard interface 96B, such as an electrical outlet and plug that permits selective connection of the offboard component (the offboard power supply 92B) with the onboard charger 94B. The onboard charger 94B is connected with an onboard battery 86. The transmission embodiments described herein that utilize such an offboard power supply system 91B may be used referred to as plug-in hybrid transmissions. The charger 94B is an onboard conductive-type charger that regulates the flow of electrical power from the offboard power supply 92B to the battery 86. When the battery 86 is sufficiently recharged, the connection through interface 96B is terminated, and the recharged battery 86 is then used as discussed herein to power the motor/generators 80, 82, such as in the electric-only mode.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission comprising:
an input member and an output member;
first and second motor/generators;
a first planetary gear set having a first gear member, a second gear member, and a third gear member, the gear members being a sun gear member, a ring gear member, and a carrier member rotatably supporting a set of pinion gears that intermesh with both the sun gear member and the ring gear member;
three additional planetary gear sets having five additional gear members including a fourth gear member, a fifth gear member, a sixth gear member, a seventh gear member, and an eighth gear member, the five additional gear members each being one of a sun gear member, a carrier member, and a ring gear member, and none of the five additional gear members being continuously connected for common rotation with one another;
wherein the first motor/generator is connected with the first gear member, the input member is connected with the second gear member, the second motor/generator is connected with the third gear member, and the first gear member is continuously connected for common rotation with one of the five additional gear members;
at least four torque-transmitting mechanisms each of which is selectively engageable to connect a respective one of the gear members to one of another respective one of the gear members and a stationary member, selective engagement of a respective one or ones of the torque-transmitting mechanisms establishing a reverse electrically-variable operating mode, and at least three forward electrically-variable operating modes including a first forward electrically-variable mode, a second forward electrically-variable mode, and a third forward electrically-variable mode achieved subsequent to a selected one of the first and second forward electrically-variable modes as speed of the output member increases.

2. The electrically-variable transmission of claim 1, further comprising:
a battery operatively connected to the motor/generators for providing power to and receiving power from the motor/generators; wherein the battery is configured to be operatively connectable with an offboard power supply for recharging the battery; and
wherein engagement of two of said torque-transmitting mechanisms establishes an electric-only mode in which the input member does not rotate and the first and second motor/generators act as motors utilizing power from the recharged battery to provide driving torque at the output member.

3. The electrically-variable transmission of claim 1, wherein the first and second forward electrically-variable modes are input-split modes and the third forward electrically-variable mode is a compound-split mode.

4. The electrically-variable transmission of claim 1, wherein the three additional planetary gear sets include a second planetary gear set;
wherein the torque-transmitting mechanisms include two brake-type torque-transmitting mechanisms each selectively engageable to connect with the stationary member a respective one of the gear members of the three additional planetary gear sets not continuously connected with any of the input member, the output member, the first motor/generator and the second motor/generator;
wherein the torque-transmitting mechanisms further include three rotating-type torque-transmitting mechanisms, one of which is selectively engageable to connect one of the gear members of the second planetary gear set connected with the input member to one of the gear members of the second planetary gear set connectable with the stationary member by one of the three brake-type torque-transmitting mechanisms and two others of which connect another one of the gear members of the second planetary gear set with a respective different one of the gear members of the third planetary gear set.

5. The electrically-variable transmission of claim 1, wherein the first gear member is continuously connected for common rotation with the fourth gear member;
wherein the at least four torque-transmitting mechanisms include:
a first torque-transmitting mechanism selectively engageable to connect the second gear member for common rotation with the fifth gear member;
a second torque-transmitting mechanism selectively engageable to ground the fifth gear member to the stationary member; wherein the output member is connected with the sixth gear member;
a third torque-transmitting mechanism selectively engageable to ground the seventh gear member to the stationary member;
a fourth torque-transmitting mechanism selectively engageable to ground the eighth gear member to the stationary member;
wherein engagement of the third torque-transmitting mechanism, the fourth torque-transmitting mechanism and the first torque-transmitting mechanism provide, sequentially, the first forward electrically-variable mode, the second forward electrically-variable mode and the third forward electrically-variable mode; and wherein engagement of the second torque-transmitting mechanism establishes the reverse electrically-variable mode.

6. The electrically-variable transmission of claim 5, further comprising:
a fifth torque-transmitting mechanism selectively engagable to connect the first gear member to the third gear member during the reverse electrically-variable mode to establish a reverse fixed ratio mode.

7. The electrically-variable transmission of claim 5, further comprising:
a sixth torque-transmitting mechanism selectively engagable to ground the fourth gear member to the stationary member; and wherein selective engagement of the sixth torque-transmitting mechanism and different combinations of others of the torque-transmitting mechanisms provides multiple forward fixed ratio modes.

8. The electrically-variable transmission of claim 5, further comprising:
a seventh torque-transmitting mechanism selectively engagable to ground the third gear member to the stationary member; wherein selective engagement of the seventh torque-transmitting mechanism and different combinations of others of the torque-transmitting mechanisms provides multiple forward fixed ratio modes.

9. The electrically-variable transmission of claim 5, wherein engagement of the second torque-transmitting mechanism during the third forward electrically-variable mode establishes an electric-only mode in which the input member does not rotate and the first and second motor/generators act as motors, each providing torque that is combined to drive the output member.

10. An electrically-variable transmission comprising:
an input member and an output member;
first and second motor/generators;
a first planetary gear set having a first gear member, a second gear member, and a third gear member, the gear members being a sun gear member, a ring gear member, and a carrier member rotatably supporting a set of pinion gears that intermesh with both the sun gear member and the ring gear member;
at least two additional planetary gear sets having five additional gear members including a fourth gear member, a fifth gear member, a sixth gear member, a seventh gear member, and an eighth gear member, the five additional gear members each being one of a sun gear member, a carrier member, and a ring gear member, and none of the five additional gear members being continuously connected for common rotation with one another;
wherein the first motor/generator is connected with the first gear member, the input member is connected with the second gear member, the second motor/generator is connected with the third gear member, and the first gear member is continuously connected for common rotation with the fourth gear member;
a first torque-transmitting mechanism selectively engageable to connect the second gear member for common rotation with the fifth gear member;
a second torque-transmitting mechanism selectively engageable to ground the fifth gear member to a stationary member; wherein the output member is connected with the sixth gear member;
a third torque-transmitting mechanism selectively engageable to engage the seventh gear member with one of the stationary member and the eighth gear member;
a fourth torque-transmitting mechanism selectively engageable to ground the eighth gear member to the stationary member; and
wherein engagement of selected ones of the torque-transmitting mechanisms alone or in different combinations at least partially establishes multiple forward electrically-variable modes and a reverse electrically-variable mode.

11. The electrically-variable transmission of claim 10, wherein the third torque-transmitting mechanism is a rotating clutch selectively engageable to connect the seventh gear member with the eighth gear member.

12. The electrically-variable transmission of claim 10, wherein the third torque-transmitting mechanism is a brake-type clutch selectively engageable to connect the seventh gear member with the stationary member.

13. The electrically-variable transmission of claim 10, further comprising:
a fifth torque-transmitting mechanism selectively engagable to connect the sixth gear member with the seventh gear member; wherein engagement of the third and fourth torque-transmitting mechanisms establishes a first of the multiple forward electrically-variable modes; wherein engagement of the fourth and fifth torque-transmitting mechanisms establishes a second of the multiple forward electrically-variable modes; wherein engagement of the first and the fifth torque-transmitting mechanisms establishes a third of the multiple forward electrically-variable modes; wherein the third forward electrically-variable mode is established sequentially after either of the first and second forward electrically-variable modes as speed of the output member increases; and wherein engagement of the third torque-transmitting mechanism and the fifth torque-transmitting mechanism establishes a fourth of the multiple forward electrically-variable modes; wherein the fourth electrically-variable mode is an input-split mode established sequentially after the third forward electrically-variable mode as speed of the output member increases.

14. The electrically-variable transmission of claim 10, wherein alternate engagement of the third torque-transmitting mechanism and the fourth torque-transmitting mechanism establishes a first of the multiple forward electrically-variable modes and a second of the multiple forward electrically-variable modes, respectively; wherein engagement of the first torque-transmitting mechanism establishes a third of the multiple forward electrically-variable modes subsequent to a selected one of the alternate first and second forward electrically-variable modes as speed of the output member increases.

15. The electrically-variable transmission of claim 10, wherein the multiple forward electrically-variable modes include first and second forward electrically-variable modes that are input-split modes and a third forward electrically-variable mode that is a compound-split mode.

16. The electrically-variable transmission of claim 15, wherein the multiple forward electrically-variable modes include a fourth electrically-variable mode; and wherein the third and fifth torque-transmitting mechanisms are engaged to establish the fourth forward electrically-variable mode subsequent to the third forward electrically-variable mode as speed of the output member increases.

17. The electrically-variable transmission of claim 16, wherein the first, second and fourth forward electrically-variable modes are input-split modes and the third forward electrically-variable mode is a compound-split mode.

18. An electrically-variable transmission comprising:
an input member and an output member;
first and second motor/generators;
a first, a second and a third planetary gear set each having a sun gear member, a ring gear member, and a carrier member rotatably supporting a set of pinion gears that intermesh with both the sun gear member and the ring gear member;
wherein the input member is connected for common rotation with the carrier member of the first planetary gear set; wherein the output member is connected for common rotation with the carrier member of the third planetary gear set; wherein the first motor/generator is connected with the ring gear member of the first planetary gear set; wherein the second motor/generator is connected with the sun gear member of the first planetary gear set;

a first interconnecting member continuously interconnecting the ring gear member of the first planetary gear set for common rotation with the sun gear member of the second planetary gear set;

a second interconnecting member continuously interconnecting the carrier member of the second planetary gear set for common rotation with the ring gear member of the third planetary gear set;

a first brake-type torque-transmitting mechanism selectively engagable to ground the carrier member of the second planetary gear set with a stationary member;

a second brake-type torque-transmitting mechanism selectively engagable to ground the sun gear member of the third planetary gear set with the stationary member;

a first rotating-type torque-transmitting mechanism selectively engagable to connect the carrier member of the first planetary gear set for common rotation with the carrier member of the second planetary gear set;

an additional torque-transmitting mechanism selectively engagable to connect the ring gear member of the second planetary gear set with one of the stationary member and the sun gear member of the third planetary gear set;

a second rotating clutch-type torque-transmitting mechanism selectively engagable to connect the ring gear member of the second planetary gear set for common rotation with the carrier member of the third planetary gear set;

wherein engagement of the second brake-type torque-transmitting mechanism and the additional torque-transmitting mechanism establishes a first electrically-variable forward mode; wherein engagement of the second brake-type torque-transmitting mechanism and the second rotating clutch-type torque-transmitting mechanism establishes a second electrically-variable forward mode; and wherein engagement of the first rotating-type torque-transmitting mechanism and the second rotating clutch-type torque-transmitting mechanism establishes a third electrically-variable forward mode.

19. The electrically-variable transmission of claim 18, further comprising:

a battery operatively connected to the motor/generators for providing power to and receiving power from the motor/generators; wherein the battery is configured to be operatively connectable with an offboard power supply for recharging the battery; and wherein engagement of the first rotating-type torque-transmitting mechanism, the second rotating-type torque-transmitting mechanism, and the other of said brake-type torque-transmitting mechanisms establishes an electric-only mode in which the input member does not rotate and the first and second motor/generators act as motors utilizing power from the recharged battery to provide driving torque at the output member.

20. The electrically-variable transmission of claim 18, wherein the additional torque-transmitting mechanism is a rotating-type torque-transmitting mechanism that is selectively engagable to connect the ring gear member of the second planetary gear set for common rotation with the sun gear member of the third planetary gear set.

21. The electrically-variable transmission of claim 18, further comprising:

a third brake-type torque-transmitting mechanism selectively engagable to ground the sun gear member of the first planetary gear set to the stationary member; wherein selective engagement of the third brake-type torque-transmitting mechanism and different combinations of others of the torque-transmitting mechanisms provides multiple forward fixed ratio modes.

22. The electrically-variable transmission of claim 18, wherein engagement of the additional torque-transmitting mechanism and the second rotating clutch-type torque-transmitting mechanism establishes a fourth electrically-variable mode; and wherein engagement of the first brake-type torque-transmitting mechanism and the additional torque-transmitting mechanism establishes a reverse electrically-variable mode.

* * * * *